(12) United States Patent
Sugimae et al.

(10) Patent No.: US 12,397,206 B2
(45) Date of Patent: *Aug. 26, 2025

(54) GOLF CLUB HEAD WITH IMPROVED INERTIA PERFORMANCE

(71) Applicant: Acushnet Company, Fairhaven, MA (US)

(72) Inventors: Ryuichi Sugimae, San Diego, CA (US); Peter Larsen, San Marcos, CA (US); Stephen S. Murphy, Carlsbad, CA (US); Scott A. Knutson, Escondido, CA (US); Charles E. Golden, Encinitas, CA (US); Joey Ashcroft, Oceanside, CA (US); Richard L. Cleghorn, Oceanside, CA (US); Gregory D. Johnson, Tucson, AZ (US); Gentry Ferguson, San Marcos, CA (US); Peter L. Soracco, Carlsbad, CA (US); Noah de la Cruz, San Diego, CA (US); Hiroshi Kawaguchi, Aliso Viejo, CA (US)

(73) Assignee: Acushnet Company, Fairhaven, MA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/365,048

(22) Filed: Aug. 3, 2023

(65) Prior Publication Data

US 2023/0381606 A1    Nov. 30, 2023

Related U.S. Application Data

(60) Division of application No. 17/521,089, filed on Nov. 8, 2021, now Pat. No. 11,752,405, which is a division
(Continued)

(51) Int. Cl.
*A63B 53/08* (2015.01)
*A63B 53/04* (2015.01)
(Continued)

(52) U.S. Cl.
CPC ............. *A63B 53/08* (2013.01); *A63B 53/06* (2013.01); *A63B 53/0437* (2020.08);
(Continued)

(58) Field of Classification Search
CPC ..... A63B 53/08; A63B 53/06; A63B 53/0466; A63B 2053/0491; A63B 2209/00; A63B 53/0437; F16B 33/004; F16B 21/02
(Continued)

(56) References Cited

U.S. PATENT DOCUMENTS 6,162,132 A    12/2000  Yoneyama
6,491,592 B2   12/2002  Cackett et al.
(Continued)

FOREIGN PATENT DOCUMENTS

CN    101060892    10/2007
CN    102886130    1/2013
(Continued)

*Primary Examiner* — Sebastiano Passaniti

(57) ABSTRACT

A golf club head that is capable improving on the inertia properties of a golf club head all while also improving the Center of Gravity (CG) location is disclosed herein. More specifically, the golf club head in accordance with the present invention achieves a relative low Moment of Inertia (MOI) about the Z-axis (MOI-Z) as well as a relatively low MOI about the Shaft-axis (MOI-SA), all combined with a high MOI about the X and Y-axis (MOI-X and MOI-Y).

11 Claims, 24 Drawing Sheets

Related U.S. Application Data of application No. 16/780,040, filed on Feb. 3, 2020, now Pat. No. 11,213,730, which is a continuation-in-part of application No. 16/539,622, filed on Aug. 13, 2019, now Pat. No. 11,027,178, which is a continuation-in-part of application No. 16/219,651, filed on Dec. 13, 2018, now abandoned.

(51) Int. Cl.
  *A63B 53/06* (2015.01)
  *F16B 21/02* (2006.01)
  *F16B 33/00* (2006.01)

(52) U.S. Cl.
  CPC ... *A63B 53/0466* (2013.01); *A63B 2053/0491* (2013.01); *A63B 2209/00* (2013.01); *F16B 21/02* (2013.01); *F16B 33/004* (2013.01)

(58) Field of Classification Search
  USPC .................................................. 473/334–339
  See application file for complete search history.

(56) References Cited

U.S. PATENT DOCUMENTS

| | | | |
|---|---|---|---|
| 7,166,038 | B2 | 1/2007 | Williams et al. |
| 7,318,782 | B2 | 1/2008 | Imamoto et al. |
| 7,344,452 | B2 | 3/2008 | Imamoto et al. |
| 7,438,649 | B2 | 10/2008 | Ezaki et al. |
| 7,497,789 | B2 | 3/2009 | Burnett et al. |
| 7,530,903 | B2 | 5/2009 | Imamoto et al. |
| 7,691,008 | B2 | 4/2010 | Oyama |
| 7,806,781 | B2 | 10/2010 | Imamoto |
| 7,850,542 | B2 | 12/2010 | Cackett et al. |
| 8,025,591 | B2 | 9/2011 | De La Cruz et al. |
| 8,100,781 | B2 | 1/2012 | Burnett et al. |
| 8,197,357 | B1 | 6/2012 | Rice et al. |
| 8,308,582 | B2 | 11/2012 | Tanimoto |
| 8,444,506 | B2 | 5/2013 | Watson et al. |
| 8,540,588 | B2 | 9/2013 | Rice |
| 8,622,847 | B2 | 1/2014 | Beach et al. |
| 8,636,608 | B2 | 1/2014 | De la Cruz et al. |
| 8,636,610 | B2 | 1/2014 | Golden et al. |
| 8,753,226 | B2 | 6/2014 | Rice et al. |
| 8,858,362 | B1 | 10/2014 | Leposky et al. |
| 8,979,671 | B1 | 3/2015 | DeMille et al. |
| 9,174,096 | B2 | 11/2015 | Sargent et al. |
| 9,192,831 | B2 | 11/2015 | Stites et al. |
| 9,205,312 | B2 | 12/2015 | Zimmerman et al. |
| 9,259,627 | B1 | 2/2016 | Myers et al. |
| 9,381,410 | B2 | 7/2016 | Golden et al. |
| 9,387,373 | B1 | 7/2016 | DeMille et al. |
| 9,427,637 | B2 | 8/2016 | Beach et al. |
| 9,440,126 | B2 | 9/2016 | Boyd |
| 9,498,688 | B2 | 11/2016 | Galvan et al. |
| 9,687,700 | B2 | 6/2017 | Honea et al. |
| 9,814,954 | B2 | 11/2017 | Westrum et al. |
| 9,868,036 | B1 | 1/2018 | Kleinert et al. |
| 9,908,014 | B1 | 3/2018 | Wester et al. |
| 9,950,222 | B2 | 4/2018 | Albertsen et al. |
| 9,968,834 | B1 | 5/2018 | Seluga et al. |
| 9,987,533 | B2 | 6/2018 | Oldknow et al. |
| 10,065,094 | B2 | 9/2018 | Wallin |
| 10,207,160 | B2 | 2/2019 | Johnson et al. |
| 10,293,225 | B2 | 5/2019 | Sargent et al. |
| 10,434,380 | B2 | 10/2019 | Kawaguchi |
| 10,603,555 | B2 | 3/2020 | Beach et al. |
| 10,617,916 | B2 | 4/2020 | Milleman et al. |
| 10,675,514 | B2 | 6/2020 | Spackman et al. |
| 10,751,585 | B2 | 8/2020 | Johnson et al. |
| 10,864,413 | B2 | 12/2020 | Stokke et al. |
| 11,027,178 | B2 | 6/2021 | Sugimae et al. |
| 11,040,256 | B2 | 6/2021 | Milleman et al. |
| 11,117,026 | B2 | 9/2021 | Stokke |
| 11,192,005 | B2 * | 12/2021 | Bennett .................. A63B 60/02 |
| 11,213,730 | B2 | 1/2022 | Sugimae et al. |
| 11,331,546 | B2 * | 5/2022 | Golden .................. A63B 60/02 |
| 11,701,559 | B2 * | 7/2023 | Bennett .................. A63B 53/06 473/335 |
| 11,752,405 | B2 * | 9/2023 | Sugimae ............ A63B 53/0408 473/334 |
| 12,115,419 | B2 * | 10/2024 | Golden .................. A63B 60/02 |
| 2004/0092332 | A1 | 5/2004 | Willett |
| 2010/0075774 | A1 | 3/2010 | Ban |
| 2011/0224017 | A1 | 9/2011 | Thomas et al. |
| 2014/0004972 | A1 | 1/2014 | Thomas et al. |
| 2014/0038737 | A1 | 2/2014 | Roach et al. |
| 2015/0273293 | A1 | 10/2015 | Akiyama et al. |
| 2015/0297961 | A1 | 10/2015 | Voshall et al. |
| 2015/0360094 | A1 | 12/2015 | Deshmukh |
| 2017/0050091 | A1 | 2/2017 | Shimahara et al. |
| 2017/0136321 | A1 * | 5/2017 | Gibbs .................... A63B 60/02 |
| 2017/0259128 | A1 | 9/2017 | Greensmith et al. |
| 2020/0121999 | A1 | 4/2020 | Sargent et al. |
| 2020/0206589 | A1 | 7/2020 | Parsons et al. |
| 2021/0138323 | A1 | 5/2021 | Harbert et al. |
| 2021/0220709 | A1 | 7/2021 | Johnson et al. |
| 2021/0283473 | A1 | 9/2021 | Stokke et al. |

FOREIGN PATENT DOCUMENTS

| | | |
|---|---|---|
| JP | 2006288882 | 10/2006 |
| JP | 2016-19731 | 2/2016 |
| KR | 10-2020-0039768 | 4/2020 |

* cited by examiner

GOLF CLUB HEAD WITH IMPROVED INERTIA PERFORMANCE

RELATED APPLICATIONS

The present application is a divisional of co-pending U.S. application Ser. No. 17/521,089, filed on Nov. 8, 2021, which is a divisional of U.S. application Ser. No. 16/780,040, filed on Feb. 3, 2020, which issued as U.S. Pat. No. 11,213,730 on Jan. 4, 2022, which is a continuation-in-part of U.S. application Ser. No. 16/539,622, filed on Aug. 13, 2019, which issued as U.S. Pat. No. 11,027,178 on Jun. 8, 2021, which is a continuation-in-part of U.S. application Ser. No. 16/219,651, filed on Dec. 13, 2018, the entirety of which are incorporated by reference herein.

FIELD OF THE INVENTION

The present invention relates generally to a new and improved golf club having improved Moment of Inertia (MOI) characteristics, combined with an improved Center of Gravity (CG) location. More specifically, the golf club head in accordance with the present invention achieves a relative low Moment of Inertia (MOI) about the Z-axis (MOI-Z), a low MOI about the Shaft Axis (MOI-SA), all combined with a high MOI about the X and Y-axis (MOI-X and MOI-Y) and maintaining a consistently and relatively low CG location measured along a direction normal to the hosel axis along the X-Y plane (CG-B).

BACKGROUND OF THE INVENTION

With the development of the modern day oversized metalwoods, the performance capabilities of these types of golf clubs have increased dramatically over their predecessor, "the persimmon wood". One of the ways these metalwood type golf clubs have been performing better than their predecessors is in the increase in overall distance, generally attributed to the inherent elastic deformation of thin metallic metal materials used by these metalwoods. Another way the metalwood type golf clubs have been outperforming their predecessors is in the increase in overall forgiveness of the golf club head, generally attributed to the increase in the MOI of the golf club head itself.

The MOI of a golf club head generally is a term used to describe the ability of an object to resist rotational movement upon impact with a secondary object. In the case of a golf club head, MOI refers to the ability of the golf club head to resist undesirable twisting upon impact with a golf ball, as such a twisting movement will generally change the face angle of the golf club head away from the intended target line, sending the golf ball away from the intended target.

U.S. Pat. No. 5,354,055 to MacKeil shows one of the earliest attempts to increase the MOI of a golf club head by placing the Center of Gravity (CG) location rearward. U.S. Pat. No. 6,364,788 to Helmstetter et al. shows the utilization of weighting members to help control the MOI of the golf club head. Both of these patents refer to the MOI-y of the golf club head, as it relates to the ability of the golf club head to stay stable when encountering an off-center impact in the heel and toe direction.

U.S. Pat. No. 7,850,542 to Cackett et al. illustrates a further development in the MOI research wherein a recognition of the different axis of rotation of the different MOI's. (Alternatively known as Ixx, Iyy, and Izz instead of MOI-X, MOI-Y, and MOI-Z) Despite the recognition and identification of the difference in MOI values, U.S. Pat. No. 7,850,542 only focuses its attention on Ixx and Iyy (adapted and changes to the current reference nomenclature), without any recognition of the importance of the last MOI number, Izz, nor MOI-SA and how they can affect the performance of the golf club.

Despite the above, none of the references recognizes the importance of the MOI of the golf club head horizontally forward and aft of the face (MOI-Z), and ways to design a golf club that takes advantage of the performance characteristics of golf club with more optimal MOI-Z values along with the minimized MOI-Sa values. Moreover, a closer investigation of the MOI-Z values will yield CG locations that will work in conjunction with the above MOI-Z values to create more performance. Hence, it can be seen from the above there is a need for more research and a design of a golf club capable of achieving better performance by investigating the importance of MOI-Z and MOI-SA as well as the CG location and designing a golf club head.

BRIEF SUMMARY OF THE INVENTION

One aspect of the present invention is a golf club comprised of a golf club head, a shaft coupled to the golf club head at a first end of the shaft and a grip coupled to the shaft at a second end of the shaft, where the golf club head comprises of a frontal portion further comprising a striking face that defines a face center, located at a forward portion of the golf club head; a rear portion located aft of the striking face; and at least one weighting member located near a central portion of the golf club head in a heel to toe orientation, substantially in line with and behind the face center; wherein an x-axis is defined as a horizontal axis tangent to a geometric center of said striking face with the positive direction towards a heel of said golf club head, a y-axis is a vertical axis orthogonal to said x-axis with a positive direction towards a crown of said golf club head, and a z-axis being orthogonal to both said x-axis and said y-axis with a positive direction towards a frontal portion of said golf club head, and wherein said golf club head has a MOI-Y to MOI-Z ratio of greater than about 1.50.

In another aspect of the present invention is a golf club head comprising of a golf club head comprising of a frontal portion further comprising a striking face that defines a face center, located at a forward portion of the golf club head, a rear portion located aft of the striking face, and at least one weighting member located near a central portion of the golf club head in a heel to toe orientation, substantially in line with and behind the face center; wherein an x-axis is defined as a horizontal axis tangent to a geometric center of said striking face with the positive direction towards a heel of said golf club head, a y-axis is a vertic axis orthogonal to said x-axis with a positive direction towards a crown of said golf club head, and a z-axis being orthogonal to both said x-axis and said y-axis with a positive direction towards a frontal portion of said golf club head, and wherein said golf club head has a MOI-X, MOI-Z, and CG-Z numbers that satisfies the equation $$MOI\text{-}X/MOI\text{-}Z \geq (6.7501 * CG\text{-}Z) - 99.30.$$

Another aspect of the present invention is a golf club head comprising a striking face, a crown return, a sole return and a central body member that are formed of metal. The central body member is located near the central portion of said golf club head in a heel to toe orientation, substantially in line along the z-axis, and extends from the crown return and the sole return to a back edge of said golf club.

Preferably, the golf club head is further comprised of a heel body member made of a non-metallic material and coupled to a heel side of the central body member and a toe body member made of a non-metallic material and coupled to a toe side of the central body member. The golf club head can further include two weight members, one forward near the striking face and one aft near the back edge. In one embodiment, a wall member is coupled to a crown portion of the central body member and a sole portion of the central body member and extends between the first and second weight members.

In another embodiment, the golf club head is further comprised of a central support member that is comprised of a plurality of angled strut members extending form the crown to the sole between the two weight members. Preferably, a first angled strut member extends from a crown portion of the central body member to the sole and a second angled strut member extends from a sole portion of the central body member to the crown, and the first and second angled strut members cross each other. More preferably, the first and second angled strut members extend at an angle of between 15 degrees and 75 degrees from both the y-axis and the z-axis. The golf club head can further comprise a third angled strut member that extends from a crown portion of the central body member to the sole and a fourth angled strut member that extends from a sole portion of the central body member to the crown, and the third and fourth angled strut members cross each other. The third and fourth angled strut members also extend at an angle of between 15 degrees and 75 degrees from both the y-axis and the z-axis, and preferably, the third angled strut member is coupled to the first angled strut member and the fourth angled strut member is coupled to the second angled strut member. The golf club can further comprise a vertical strut member extending vertically, substantially parallel to the y-axis, between the fourth angled strut member and the third angled strut member.

These and other features, aspects and advantages of the present invention will become better understood with reference to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

The following detailed description describes the best currently contemplated modes of carrying out the invention. The description is not to be taken in a limiting sense, but is made merely for the purpose of illustrating the general principles of the invention, since the scope of the invention is best defined by the appended claims.

Various inventive features are described below and each can be used independently of one another or in combination with other features. However, any single inventive feature may not address any or all of the problems discussed above or may only address one of the problems discussed above. Further, one or more of the problems discussed above may not be fully addressed by any of the features described below.

Before beginning the discussion on the current inventive golf club head and its performance criteria, it is worthwhile to note here that the discussion below will be based on a coordinate system 101 and axis of measurement that is critical to the proper valuation of the performance numbers. Hence, it is important to recognize here that although the specific names given for the measurements below are important to the understanding of the current invention, the naming nomenclature should not be viewed in vacuum. Rather, the importance is the numbers presented below needs to be taken in context with how the coordinate system relates to the golf club head itself. In order to provide sufficient information to avoid any ambiguity, each of the figures provided below referencing a golf club head will all be accompanied by a coordinate system that is all consistent with one another.

Figure 1:
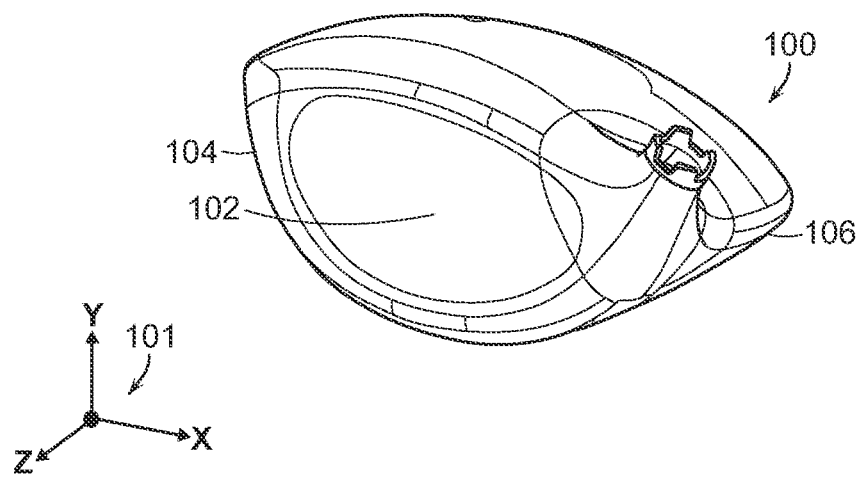
FIG. 1 of the accompanying drawings shows a perspective view of a golf club head in accordance with an exemplary embodiment of the present invention.

Pursuant to the above, and to establish the reference coordinate system for the subsequent discussion, FIG. 1 of the accompanying drawings shows the coordinate system 101 that will be used to define the various measurement and performance figures for the current invention. The x-axis used by the current discussion refers to the axis that is horizontal to the striking face from a heel to toe direction. The y-axis used by the current discussion refers to the vertical axis through the club in a crown to sole direction. The t-axis used by the current discussion refers to the horizontal axis that is horizontal front to back in a forward and rear direction. Alternatively speaking, it can be the x-axis is defined as a horizontal axis tangent to a geometric center of the striking face with the positive direction towards a heel of the golf club head, a y-axis is a vertical axis orthogonal to the x-axis with a positive direction towards a top of the golf club head, and a z-axis being orthogonal to both the x-axis and the y-axis with a positive direction towards a front of the golf club head. The x-y-z coordinate system described above shall be the same for all subsequent discussions.

FIG. 1 of the accompanying drawings shows a perspective view of a golf club head 100 in accordance with an embodiment of the present invention. In this perspective view shown in FIG. 1, the golf club head 100 may not look very different than other golf club heads, but the subsequent figures and discussion will show that the internal components and the material properties of this golf club head 100 allows it to achieve unique performance properties consistent with the present invention. What FIG. 1 does show is a location of a face center 102 of the frontal portion 104 of the golf club head 100 that contains a striking face insert. The face center, as shown here and referred to by the current invention, relates to the geometric center of the striking face portion of said golf club head 100 measured by the USGA provided face center template as it would be commonly known to a person of ordinary skill in the golf club art. Attached to the rear of the frontal portion 104 is a rear portion 106, which makes up the back end of the golf club head 100.

In this embodiment of the present invention, the frontal portion 104 may generally be made out of a steel type material having a density of between about 7.75 g/cc and about 8.00 g/cc, allowing a significant portion of the mass of the golf club head 100 to be concentrated at a frontal bottom region of the golf club head 100. The rear portion 106 of the golf club head 100 in this embodiment of the present invention may generally be made out of the standard titanium material having a density of between about 4.00 g/cc and about 5.00 g/cc, allowing the rear portion 106 of the golf club head 100 to be relatively lightweight. However, it should be noted that in alternative embodiments of the present invention, the frontal portion 104 may also be made out of a standard titanium material such as TI-6-4, Ti-8-1-1, beta-titanium, or any other type of titanium material without departing from the scope and content of the present invention.

Figure 2:
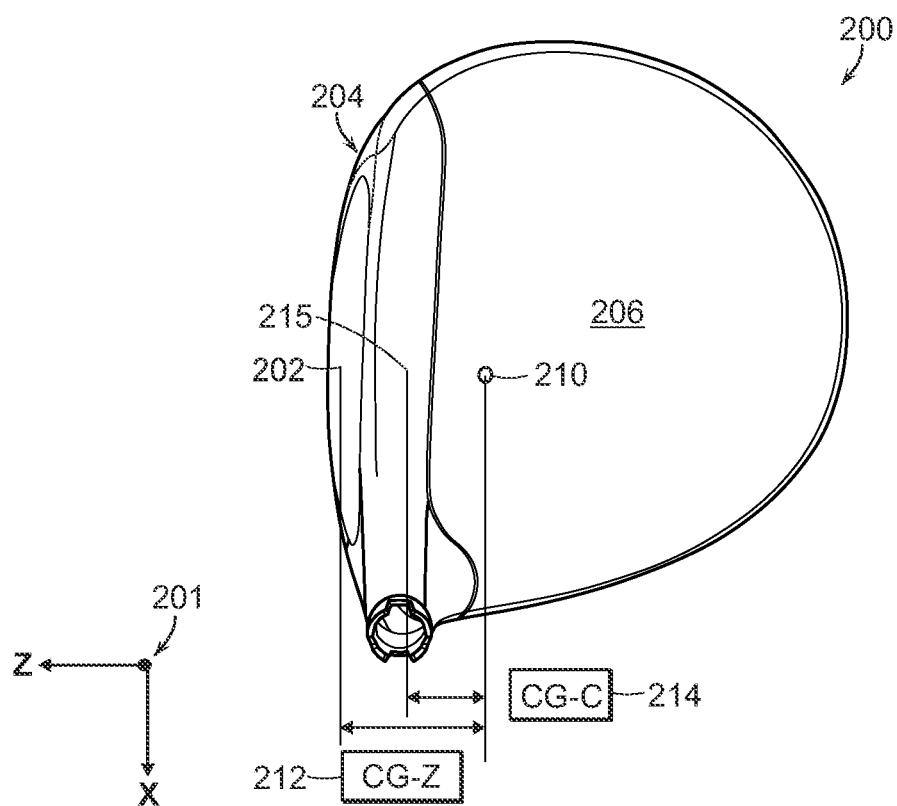
FIG. 2 of the accompanying drawings shows a top view of a golf club head in accordance with an exemplary embodiment of the present invention.
Figure 3:
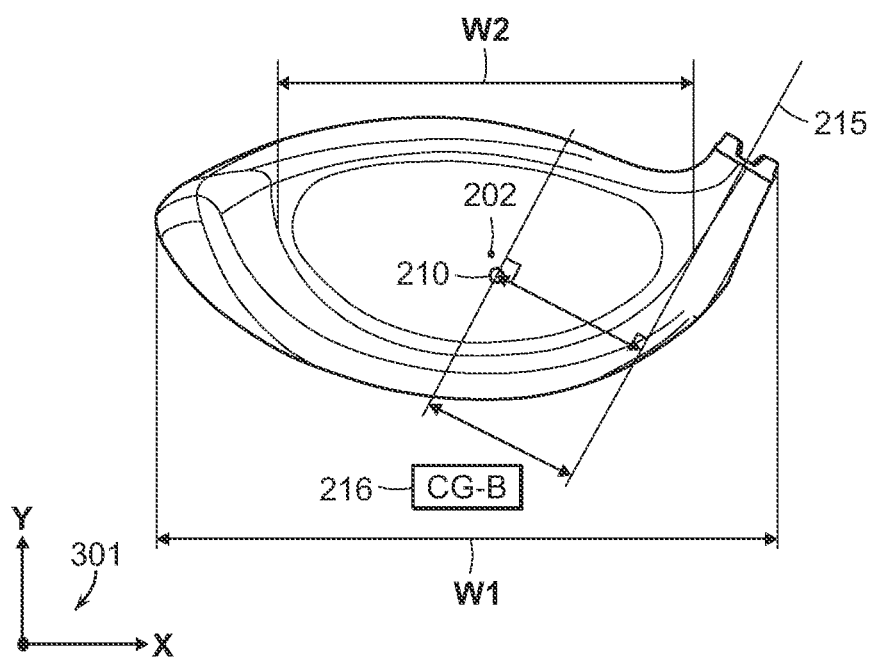
FIG. 3 of the accompanying drawings shows a frontal view of a golf club head in accordance with an exemplary embodiment of the present invention.

In order to illustrate more specific features of the golf club head 100, FIGS. 2 and 3 of the accompanying drawings is provided to give more insight into some of the specific inherent characteristics of the golf club head 200 that will be important to determine its improved performance. First off, FIG. 2 of the accompanying drawings, in addition to illustrating a golf club head 200 with a frontal portion 204 and a rear portion 206, also shows a Center of Gravity (CG) 210 location along the x-z plane on the coordinate system 201. Although the details of the CG location will be discussed in more detail with respect to the inertia properties of the golf club head 200, the general direction of the current inventive golf club head 200 is to have a CG location that is strategically located at a distance back from the frontal portion of the golf club head 200 to yield the most advantageous results.

More specifically, in the current invention, the CG location rearward from the striking face, identified here as CG-Z is generally between about 25 mm to about 40 mm, more preferably between about 26 mm and about 38 mm, and most preferably between about 27 mm and about 36 mm, all measured rearward from the face center 202 along the Z axis shown by the coordinate system 201. In addition to illustrating the CG-Z 212 numbers, an alternative measurement method is provided to measure how far back the CG 210 is located within the club head 200. In this alternative method, the CG 210 is measured from the shaft axis 215, and this measurement is illustrated as CG-C 214 is generally measured to be between about 10 mm to about 25 mm, more preferably between about 12 mm to about 23 mm, and most preferably between about 14 mm to about 21 mm, all measured rearward from the shaft axis 215 along the Z axis shown by the coordinate system 201.

It should be noted that the strategic location of the CG 210 location rearward along the Z axis, irrespective of whether it is measured from the face center 202 or the shaft axis 215, is critical to the proper functionality of the current inventive golf club head 200. If the CG 210 location is too far forward, the golf club head 200 can result in a low MOI-X and MOI-Y as well as too low of a backspin when contacting a golf ball to yield desirable results. However, in the alternative, if the CG 210 location is too far rearward, the golf club head 200 can produce too much spin to yield desirable results. Hence, it can be seen that the criticality of the CG location rearward of along the Z axis is a fine balance of a very specific range of numbers that can severely hinder the performance of the golf club head 200 if it deviates from the ranges articulated above.

FIG. 3 of the accompanying drawings shows another important CG 210 measurement that is important to the proper functionality of the current invention. More specifically, FIG. 3, in addition to illustrating all of the basic components of the golf club head 200 as previously shown, now introduces another measurement of the CG 210 location from the shaft axis 215 along an x-y plane shown by coordinate system 301. More specifically, FIG. 3 shows a CG 210 measurement that is perpendicular to the shaft axis 215 along this x-y plane away from the actual shaft axis 215 itself, called CG-B for the purpose of this application. The CG-B of the golf club head 210 may generally be between about 32 mm and about 39 mm, more preferably between about 33 mm and about 38 mm, and most preferably about 35 mm.

In addition to illustrating the very important CG-B measurement of the golf club head, FIG. 3 of the accompanying drawings also shows measurements W1 and W2, indicative of the width of the golf club head 200 itself and the width of the face of the golf club head 200 respectively. In this embodiment of the present invention, the width of the golf club head W1 may generally be between about 130 mm to and about 140 mm, more preferably between about 132 mm to about 138 mm, and most preferably about 136 mm. The width of the face W2 may generally be between about 95 mm and about 105 mm, more preferably between about 97 mm and about 103 mm, and most preferably about 100 mm.

Now that the CG location of the golf club head 200 has been defined, the other important features associated with the present invention relates to the Moment of Inertia (MOI) of the golf club head 200. The MOI of a golf club head generally depicts the ability of the golf club head to resist twisting when it impacts an object at a location that is not aligned with the CG location previously discussed. More specifically, the MOI of a golf club head relates to the ability of the golf club head to resist twisting relative to the CG location. As is well known in the art, the MOI of the golf club head 200 may generally be broken down to three unique components, relating to the ability of the golf club head 200 to resist rotation along three different axes with the origin of the three axes being coincident with the CG location of the golf club head. The three axes of rotation for which the MOI is generally referred coincides with the coordinate system 101, 201, and 301 (shown in FIG. 1, FIG. 2, and FIG. 3 respectively), where MOI-X is measured about the X axis passing through the CG location, MOI-Y is measured about the Y axis passing through the CG location, and MOI-Z is measured about the Z axis passing through the CG location.

As the previously discussion already hinted, the current inventive golf club head 200 may generally have a high value for the MOI about the X and Y axis, while maintaining a low MOI about the Z axis. More specifically, the current inventive golf club head 200 may generally have a MOI about the X axis (MOI-X) that is greater than about 300 kg-mm$^2$, more preferably greater than about 310 kg-mm$^2$, and most preferably greater than about 320 kg-mm$^2$ without departing from the scope and content of the present invention. As for MOI about the Y axis (MOI-Y), the present inventive golf club head 200 may generally have a MOI about the Y axis that is greater than about 400 kg-mm$^2$, more preferably greater than about 410 kg-mm$^2$, and most preferably greater than about 420 kg-mm$^2$ all without departing from the scope and content of the present invention.

While the large MOI number about the X and Y axis discussed previously are not necessarily new in the world of golf club head 200 designs, the ability to maintain those number while decreasing the MOI about the Z axis (MOI-Z) and holding the MOI about the Shaft axis (MOI-SA) to a minimum is what makes the present invention. While the majority of the golf industry are focusing their attention so intently on the ability of the golf club head 200 to offer forgiveness on off center hits by trying to increase the MOI-Y to astronomical numbers, they have failed to recognize the ability of the golf club head 200 to offer more club head speed and more ball speed by decreasing the MOI about the Z axis (MOI-Z) in concert with the minimization of MOI about the Shaft axis (MOI-SA). The present invention focuses its attention on that very specific unrecognized characteristic, and has developed a golf club head 200 design to take advantage and maximize the performance of the golf club head 200 by focusing on the MOI about the Z axis. More specifically, a golf club head 200 in accordance with the present invention may generally have a MOI about a Z axis that is less than about 268 kg-mm$^2$, more preferably less than about 260 kg-mm$^2$, and most preferably less than about 250 kg-mm$^2$. Additionally, the golf club head 200 may generally have a MOI about a Shaft axis that is less than about 850 kg-mm$^2$.

It should be noted here that the low MOI-Z numbers mentioned above cannot by itself accurately depict and describe the current invention; as old school golf club heads with much smaller footprint may inherently have a low MOI-Z number, combined with a low MOI-X and MOI-Y number. Hence, it is important to recognize here that the present invention is predicated on the interrelationship between the different numbers achieved by the MOI-X and MOI-Y numbers as it relates to MOI-Z and MOI-SA, in combination with the CG location articulated above.

In order to capture the essence of the present invention, a ratio can be created between the MOI-X, MOI-Y, and MOI-Z to help provide one way to quantify this relationship. In one first example, a MOI-X to MOI-Z Ratio can be created to help quantify the current golf club head 200 as illustrated by Eq. (1) below. In one exemplary embodiment of the present invention, the MOI-X to MOI-Z Ratio is greater than about 1.10, more preferably greater than about 1.20, and most preferably greater than about 1.28.

$$MOI\text{-}X \text{ to } MOI\text{-}Z \text{ Ratio} = \frac{MOI\text{-}X}{MOI\text{-}Z} \qquad \text{Eq. (1)}$$

Similarly, a comparable ratio can be established called a MOI-Y to MOI-Z Ratio to quantify the current golf club head 200 as illustrate by Eq. (2) below. In one exemplary embodiment of the present invention, the MOI-Y to MOI-Z ratio is greater than about 1.50, more preferably greater than about 1.57, and most preferably greater than about 1.68.

$$MOI\text{-}Y \text{ to } MOI\text{-}Z \text{ Ratio} = \frac{MOI\text{-}Y}{MOI\text{-}Z} \qquad \text{Eq. (2)}$$

As it can be seen from the relationship established by the Eqs (1) and (2) above, the present invention relates to a specific relationship between the MOI of the golf club head 200 with an extra focus on minimizing the MOI-Z about the Z axis while maintaining a high MOI-Y. In order to further illustrate this, a graphical representation of the relationship is provided as FIG. 4.

Figure 4:
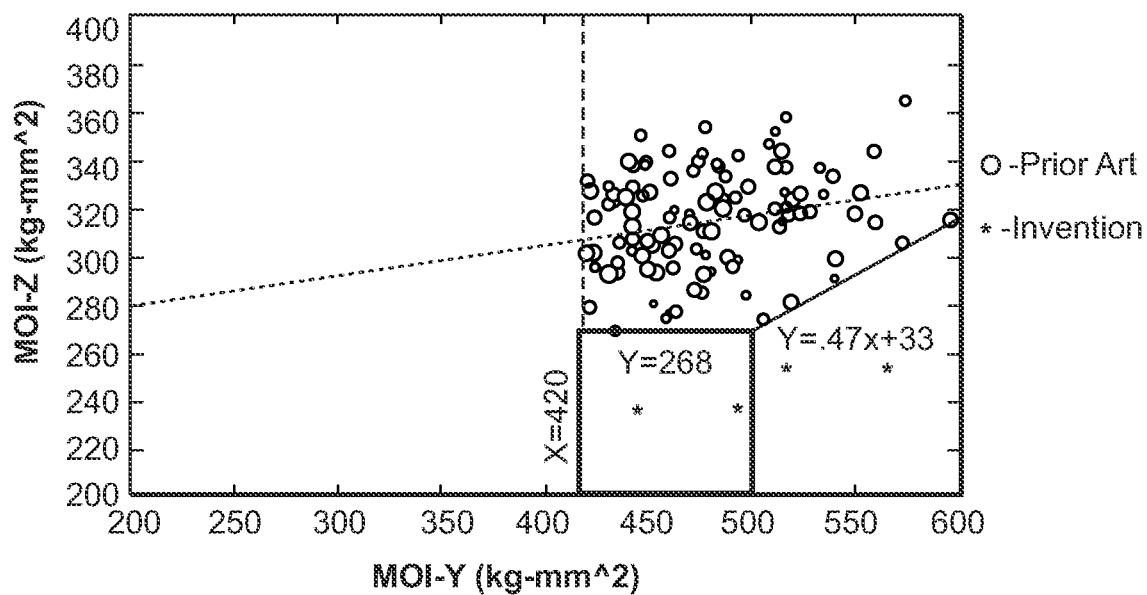
FIG. 4 of the accompanying drawings shows a plot of MOI-Z vs MOI-Y numbers for the current invention, compared to prior art golf club heads.

FIG. 4 of the accompanying drawings shows a plot of various data points of various golf club head and their respective MOI-Z numbers as well as their MOI-Y number. In FIG. 4 the X-axis represents the MOI-Y while the Y-axis represents the MOI-Z. The data points shown in FIG. 4 have been separated into circular dots and asterisks. The circular dots are representative of the data of "prior art" golf club heads, whereas the asterisk data points represent the current invention.

A closer examination of the prior art data points will show that none of the golf club heads in the prior art are capable of achieving a MOI-Z number of lower than 268 kg-mm$^2$, for all modern-day golf club heads that have a MOI-Y of greater than 420 kg-mm$^2$. However, an even closer examination of the graph of FIG. 4 will show that as the MOI-Y numbers of the golf club heads exceeds 500 kg-mm$^2$, an additional relationship can be established to quantify the ability of the present invention to achieve the optimal MOI-Z to MOI-Y relationship. In fact, that relationship is shown in FIG. 4 as Y≤0.47x+33. Combining the two conditions articulated above can result in another unique way to quantify the present invention whereas, for golf club heads having a MOI-Y of between 420 kg-mm 2 and 500 kg-mm$^2$, the golf club head generally has a MOI-Z of less than about 268 kg-mm$^2$; however, for golf club heads having a MOI-Y of greater than 500 kg-mm$^2$, the golf club head may have a MOI-Z that satisfies Eq. (3) below:

$$MOI\text{-}Z \leq (0.47*MOI\text{-}Y)+33 \qquad \text{Eq. (3)}$$

Alternatively speaking, it can be said that in one embodiment of the present invention, the golf club head 200 may have a MOI-Z that satisfies the relationship MOI-Z≤ (0.47*MOI-Y)+33 if the MOI-Y number is greater than 500 kg-mm$^2$, and a MOI-Z that is less than 268 kg-mm$^2$ if the MOI-Y number is between 420 kg-mm 2 and 500 kg-mm$^2$.

Figure 5:
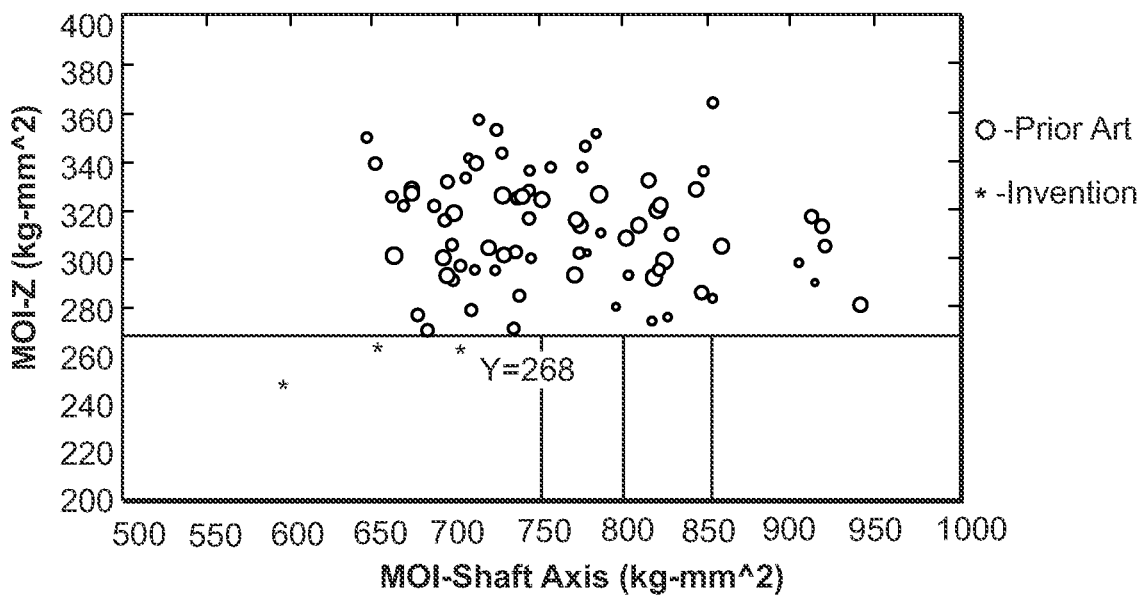
FIG. 5 of the accompanying drawings shows a plot of MOI-Z vs MOI-Shaft Axis numbers for the current invention, compared to prior art golf club heads.

FIG. 5 of the accompanying drawing introduces another MOI value relating to a golf club head not previously discussed named MOI-Shaft Axis (MOI-SA). The MOI of a golf club head as it relates to the shaft axis is defined as the ability of the golf club head to resist twisting upon impact with a golf ball at a location that is not aligned with the shaft axis. A golf club head in accordance with the present invention may generally have a MOI-SA of less than about 850 kg-mm$^2$, more preferably less than about 800 kg-mm$^2$, and most preferably less than about 750 kg-mm$^2$. The relationship between the MOI-SA and MOI-Z is highlighted in FIG. 5 and is important to the present invention. FIG. 5 of the accompanying drawings shows that irrespective of the MOI-SA numbers, all of the prior art golf club heads have a MOI-Z of greater than about 268 kg-mm$^2$, while all of the current inventive golf club heads have a MOI-Z of less than about 268 kg-mm$^2$.

Figures 6, 7:
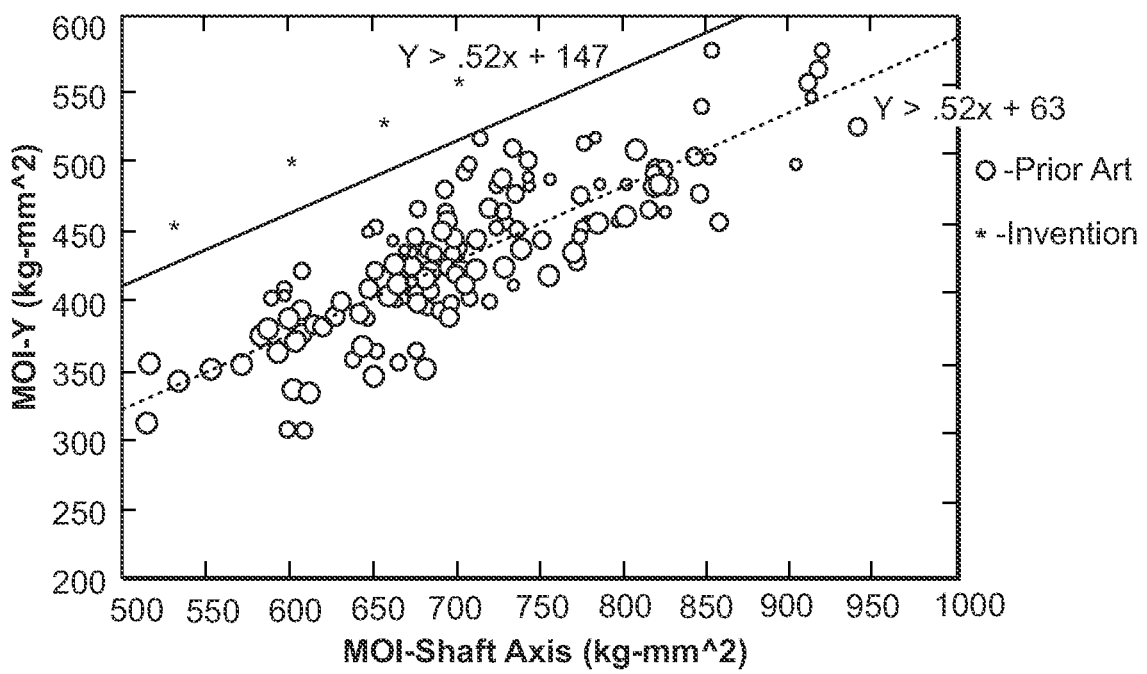
FIG. 6 of the accompanying drawings shows a plot of MOI-Y vs MOI-Shaft Axis numbers for the current invention, compared to prior art golf club heads.
FIG. 7 of the accompanying drawings shows a plot of MOI-X vs MOI-Shaft Axis numbers for the current invention, compared to prior art golf club heads.

FIG. 6 of the accompanying drawings establishes a graphical relationship between the MOI-Y of the golf club head with the newly introduced MOI-SA. As a closer examination of the graph shown in FIG. 6 will show, the current invention is capable of achieving a higher than average MOI-Y, all while keeping a relatively small MOI-SA. Similar to previous plots, the circular points on the plot will refer to prior art golf club heads, while the asterisks will refer to the current invention. Hence, it can be seen that the present invention occupies a previously unachieved space delineated by an equation Y≥0.52x+147, which when put into context with the variables used in this plot, yields Eq. (4) below:

$$MOI\text{-}Y \geq (0.52*MOI\text{-}SA)+147 \qquad \text{Eq. (4)}$$

FIG. 7 of the accompanying drawings establishes a graphical relationship between the MOI-X of the golf club head with now a familiar MOI-SA. As a closer examination of the graph shown in FIG. 7 will show, the current invention is capable of achieving a higher than average MOI-X, all while keeping a relatively small MOI-SA. Hence, it can be seen that the present invention occupies a previously unachieved space delineated by an equation Y≥0.40x+50, which when put into context with the variables used in this plot, yields Eq. (5) below:

$$MOI\text{-}X \geq (0.40 * MOI\text{-}SA) + 50 \quad \text{Eq. (5)}$$

Figure 8:
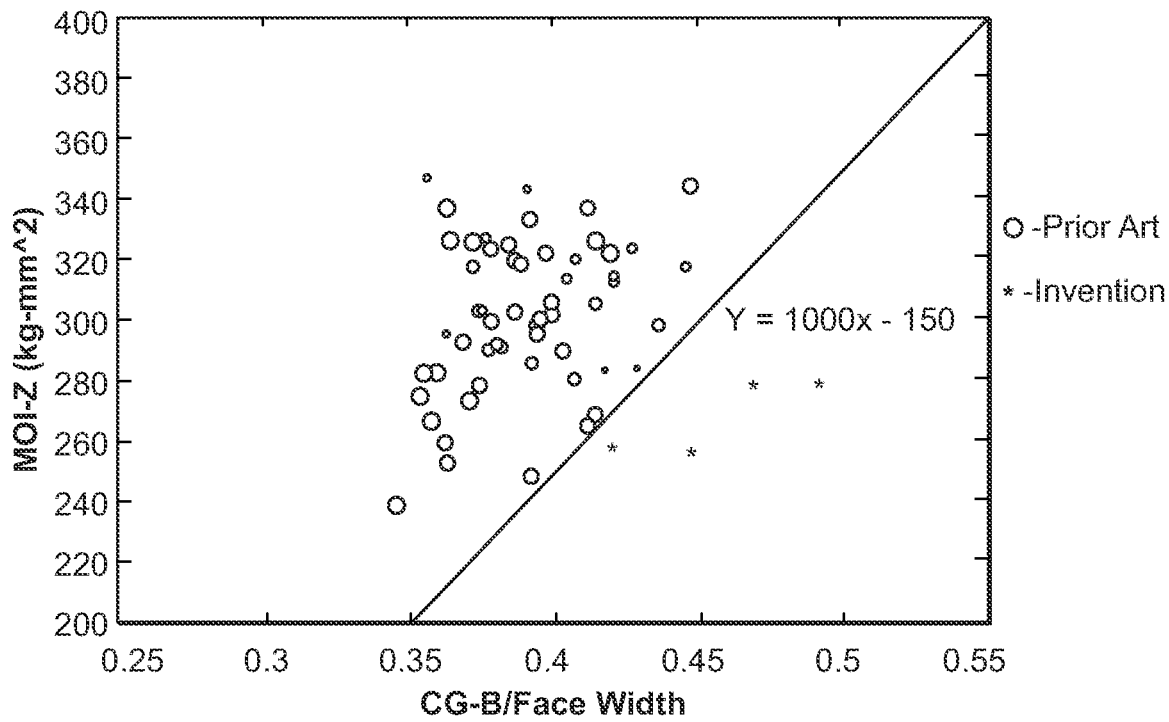
FIG. 8 of the accompanying drawings shows a plot of MOI-Z vs CG-B/Face Width numbers for the current invention, compared to prior art golf club heads.

FIG. 8 of the accompanying drawings establishes a graphical relationship between the MOI-Z of the golf club head with a ratio of CG-B/Face Width. Both the measurement for CG-B and Face Width can be found in FIG. 3 of the accompanying drawings as well as the accompanying discussion as set forth above. The CG-B measurement is explicitly shown in FIG. 3, while the Face Width referred to by the chart in FIG. 8 is shown as W2. A closer examination of the graph shown in FIG. 8 will show that the current invention is capable of achieving a lower MOI-Z, while keeping the CG-B/Face Width number fairly consistent above 0.4. CG-B/Face Width is indicative of the location of the center of gravity while keeping a moderately sized face golf club head.

In the chart shown in FIG. 8, it can be seen that the present invention occupies a previously unachieved space delineated by an equation Y≤1000x−150, which when put into context with the variable used in this plot, yields Eq. (6) below:

$$MOI\text{-}Z \leq \left(1000 * \frac{CG\text{-}B}{\text{Face Width}}\right) - 150 \quad \text{Eq. (6)}$$

Figure 9:
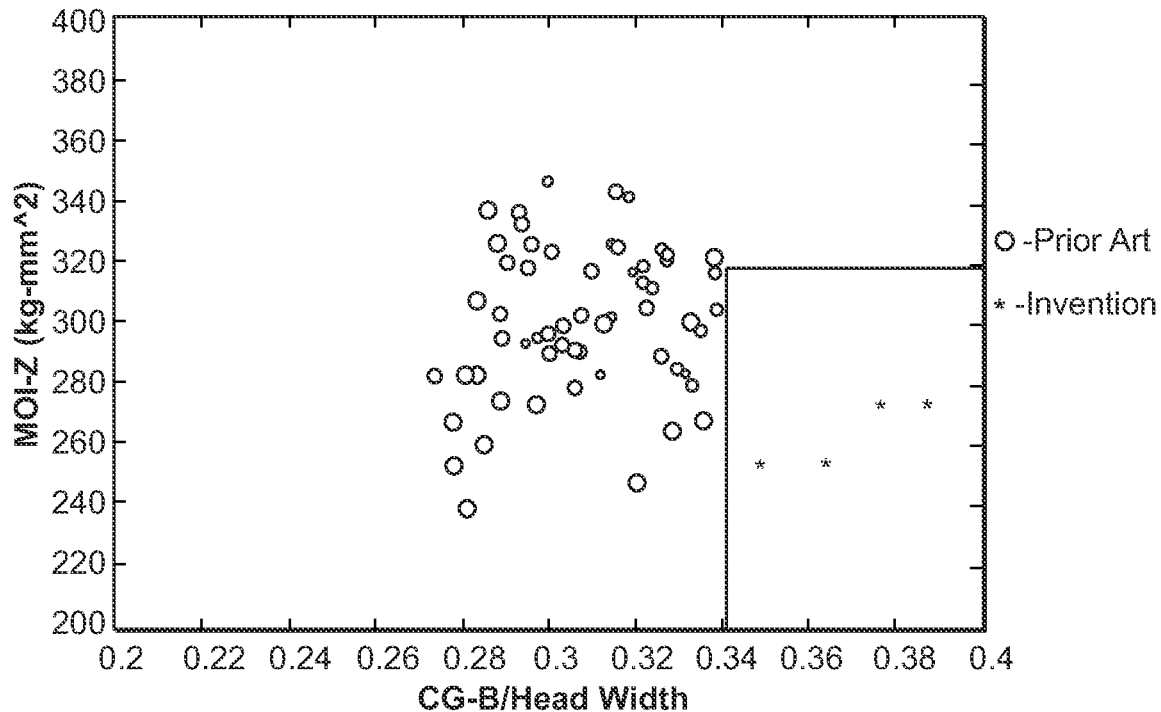
FIG. 9 of the accompanying drawings shows a plot of MOI-Z vs CG-B/Head Width numbers for the current invention, compared to prior art golf club heads.

FIG. 9 of the accompanying drawings establishes a graphical relationship between the MOI-Z of the golf club head with a ratio of CG-B/Head Width. Both the measurement for CG-B and Head Width can be found in FIG. 3 of the accompanying drawings as well as the accompanying discussion above. The CG-B measurement is explicitly shown in FIG. 3, while the Head Width referred to by the chart in FIG. 9 is shown as W1. A closer examination of the graph shown in FIG. 9 will show that the current invention is capable of achieving a lower MOI-Z, while keeping the CG-B/Head Width number fairly consistent above 0.34. CG-B/Head Width is indicative of the location of the center of gravity while keeping a moderately sized head width of the golf club head.

In the chart shown in FIG. 9, it can be seen that the present invention occupies a previously unachieved space delineated by a MOI-Z number that is lower than 320 kg-mm² combined with a CG-B/Head Width number that is greater than about 0.34.

Figure 10:
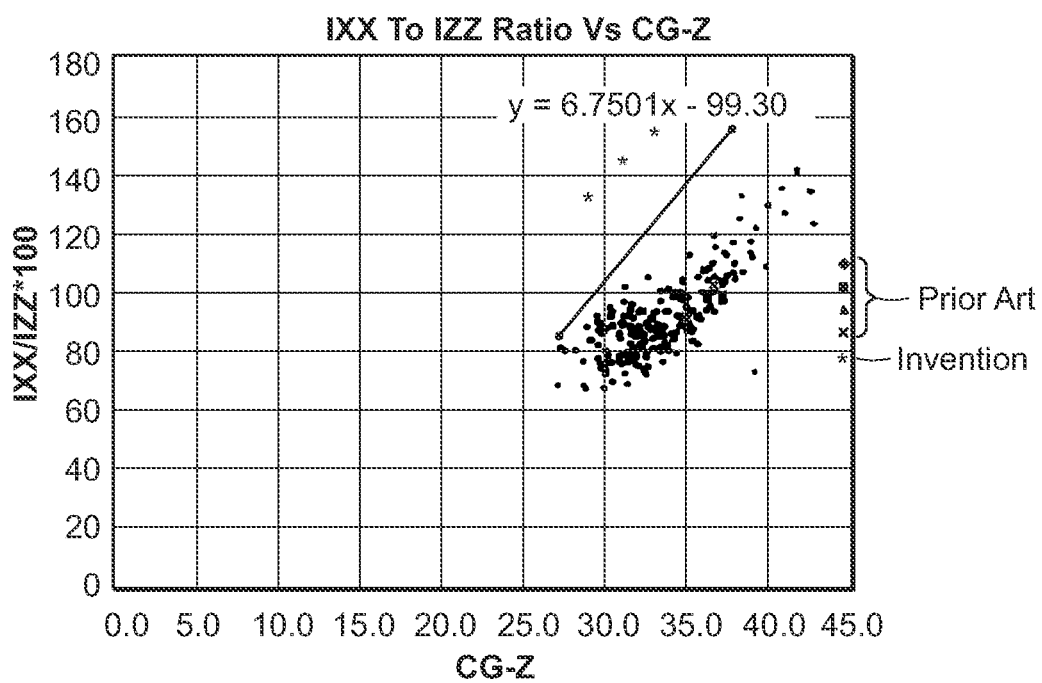
FIG. 10 of the accompanying drawings shows a plot of MOI-X/MOI-Z vs CG-Z numbers for the current invention, compared to prior art golf club heads.

FIG. 10 of the accompanying drawings establishes another graphical relationship of the performance of a golf club in accordance with an embodiment of the present invention. More specifically, FIG. 10 of the accompanying drawings shows a relationship between MOI-X/MOI-Z and CG-Z. (MOI-X is used interchangeably with Ixx, MOI-Y is used interchangeably with Iyy, and finally MOI-Z is used interchangeably with Izz) The definition and measurement for CG-Z of a golf club head can be found in the earlier discussion relating to FIG. 2 of the accompanying drawings, while the background information establishing MOI-X and MOI-Z have already been discussed previously. Although the selection of the plot for the X and Y axis may appear random initially to a person not versed in golf club design, but a closer examination will reveal that the relationship created here is absolutely critical to the proper performance of the present invention. On the Y axis of the plot shown in FIG. 10, a ratio between MOI-X and MOI-Z is created here. This ratio created illustrates the ability of the current inventive golf club head to maximize the value of one variable (MOI-X) while minimizing the value of another variable (MOI-Z); which resonates with the theme of the present invention. The CG-Z used in the X axis of the plot shown in FIG. 10 is indicative of the CG location of the golf club head rearward from the front of the golf club head, and it is desirable to maintain that in the range described above.

A further examination of the plot shown in FIG. 10 will show that the present invention occupies a portion of the graph that was previously unachieved. This portion of the graph is delineated from other prior art data points by an equation Y≥6.7501x−99.30, which when put into context with the variable used in this plot, yields Eq. (7) below:

$$\frac{MOI\text{-}X}{MOI\text{-}Z} \geq (6.7501 * CG\text{-}Z) - 99.30 \quad \text{Eq. (7)}$$

Figure 11:
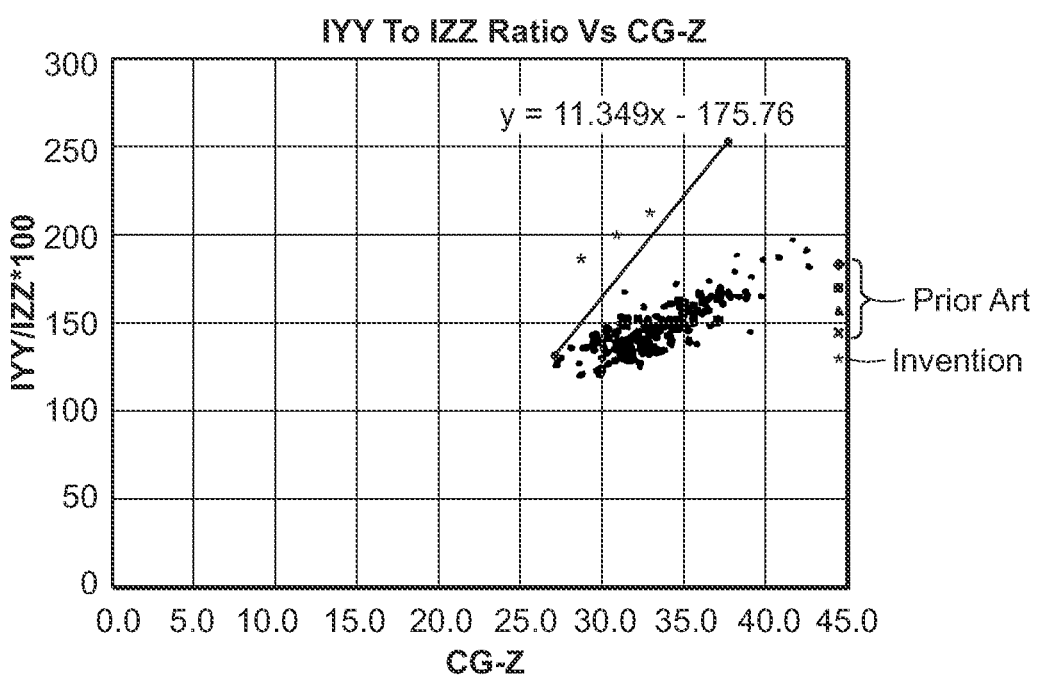
FIG. 11 of the accompanying drawings shows a plot of MOI-Y/MOI-Z vs CG-Z numbers for the current invention, compared to prior art golf club heads.

FIG. 11 of the accompanying drawings establishes another graphical relationship of a golf club in accordance with an embodiment of the present invention by creating a relationship between the MOI-Y/MOI-Z and CG-Z. The definition and measurement for CG-Z of a golf club head can be found in the earlier discussion relating to FIG. 2 of the accompanying drawings, while the background information establishing MOI-Y and MOI-Z have already been discussed previously. Similar to the previous discussion, the relationship between MOI-Y and MOI-Z is indicative of the ability of a golf club to achieve great forgiveness along the MOI-Y axis, while minimizing the MOI-Z of a golf club head to achieve a higher ball speed, as previously discussed. Similar to previous discussion, FIG. 11 of the accompanying drawings shows that the present invention is capable of achieving performance characteristics that was previously unachieved. This portion of the graph is delineated from other prior art data points by an equation Y≥11.349x−175.76, which when put into context with the variable used in this plot, yields Eq. (8) below:

$$\frac{MOI\text{-}Y}{MOI\text{-}Z} \geq (11.349 * CG\text{-}Z) - 175.76 \quad \text{Eq. (8)}$$

Figure 12:
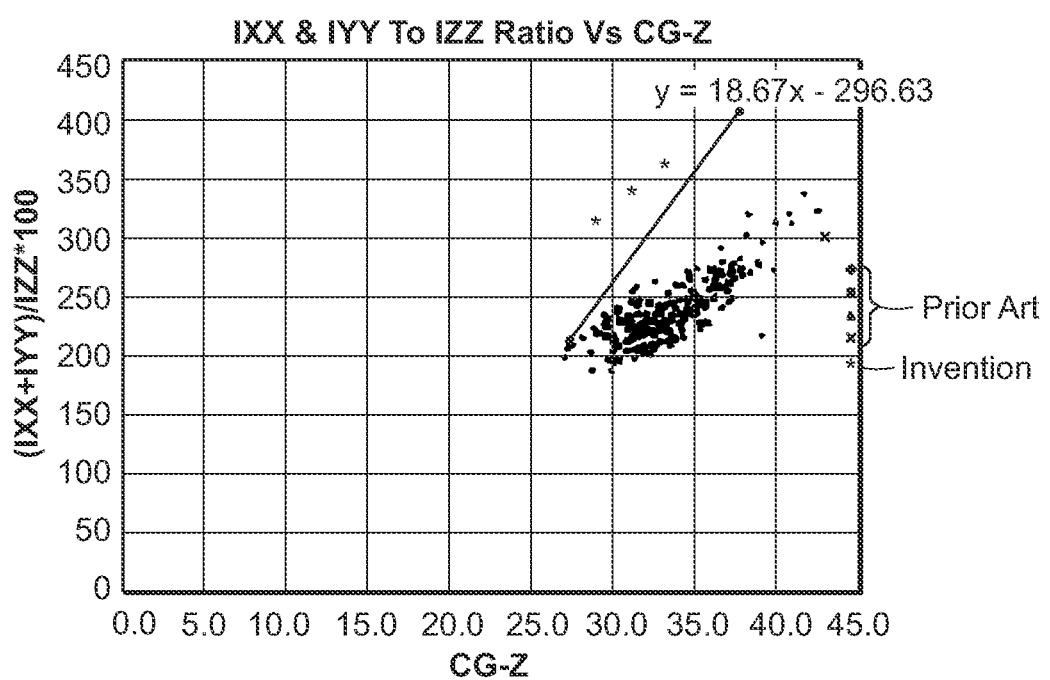
FIG. 12 of the accompanying drawings shows a plot of (MOI-X+MOI-Y)/MOI-Z vs CG-Z numbers for the current invention, compared to prior art golf club heads.

FIG. 12 of the accompanying drawings establishes another graphical relationship of a golf club in accordance with an embodiment of the present invention by creating a relationship between the (MOI-X+MOI-Y)/MOI-Z and CG-Z. The definition and measurement for CG-Z of a golf club head can be found in the earlier discussion relating to FIG. 2 of the accompanying drawings, while the background information establishing MOI-X, MOI-Y, and MOI-Z have already been discussed previously. Similar to the previous discussion, the relationship between MOI-X, MOI-Y, and MOI-Z is indicative of the ability of a golf club to achieve great forgiveness along both the MOI-X and MOI-Y axes, while minimizing the MOI-Z of a golf club head to achieve a higher ball speed, as previously discussed. Similar to previous discussion, FIG. 12 of the accompanying drawings shows that the present invention is capable of achieving performance characteristics that was previously unachieved. This portion of the graph is delineated from other prior art data points by an equation Y≥18.67x−296.63, which when put into context with the variable used in this plot, yields Eq. (9) below:

$$\frac{(MOI-X + MOI-Y)}{MOI-Z} \geq (18.67 * CG-Z) - 296.63 \qquad \text{Eq. (9)}$$

Figure 13:
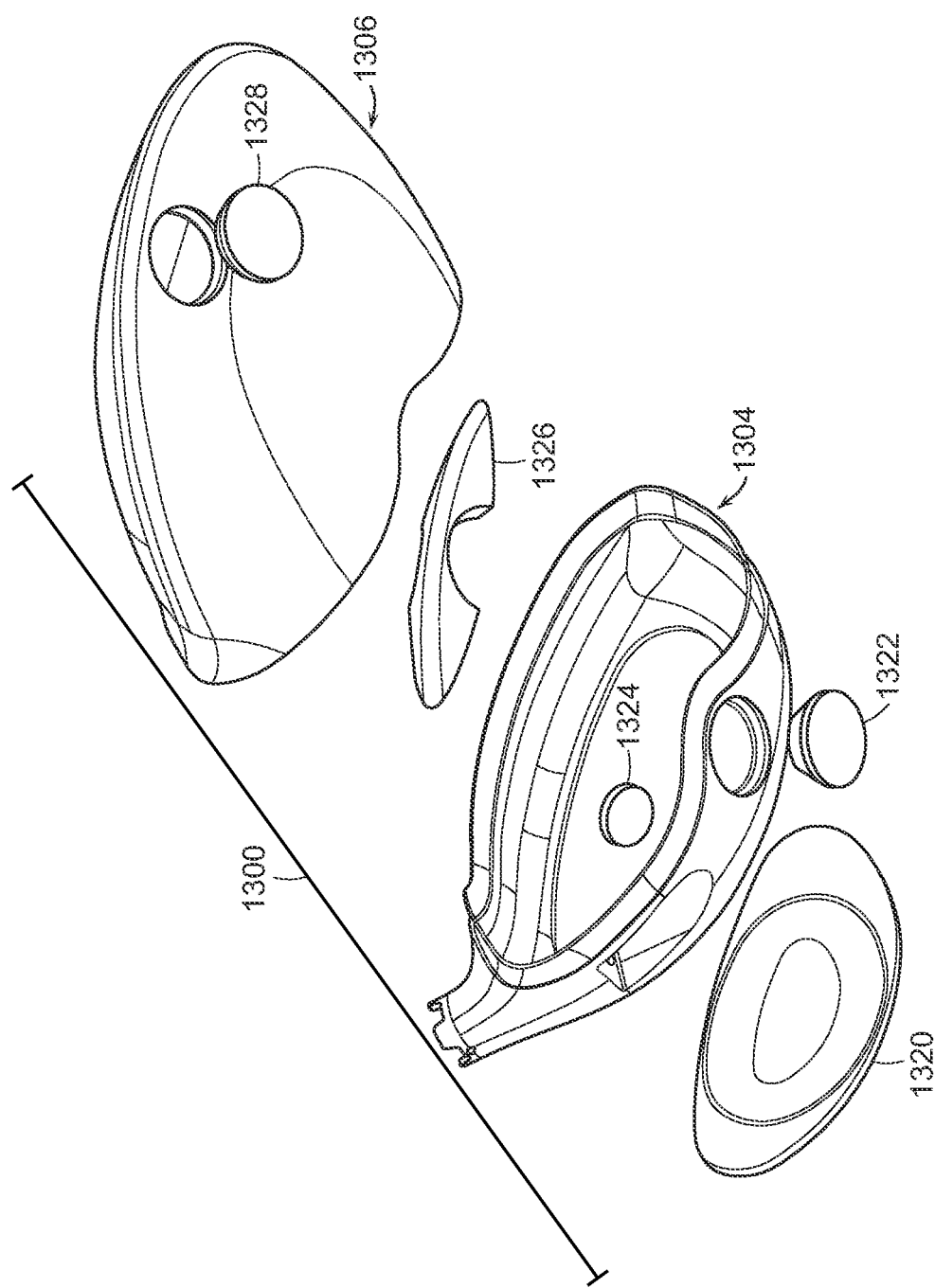
FIG. 13 of the accompanying drawings shows an exploded sole perspective view of a golf club head in accordance with an exemplary embodiment of the present invention.
Figure 14:
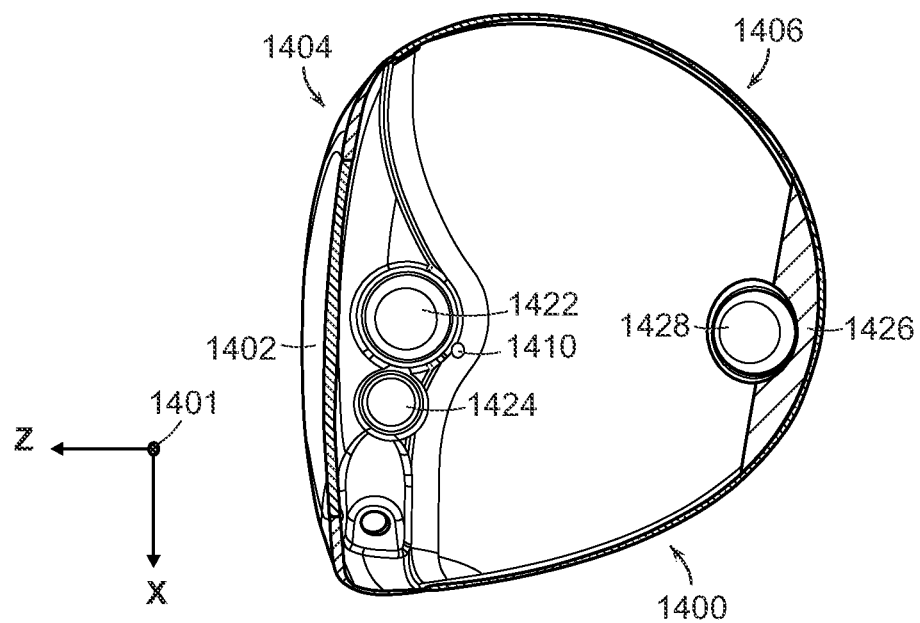
FIG. 14 of the accompanying drawings shows a horizontal cross-sectional view of a golf club head in accordance with an exemplary embodiment of the present invention.
Figure 15:
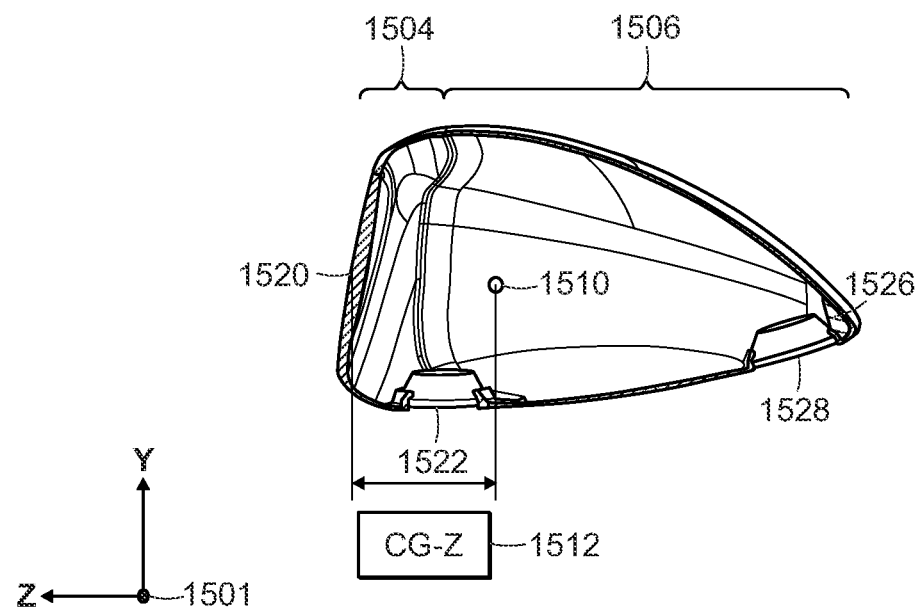
FIG. 15 of the accompanying drawings shows a vertical cross-sectional view of a golf club head in accordance with an exemplary embodiment of the present invention.

FIGS. 13 through 15 show different exploded and cross-sectional view of golf club heads and their internal components that are used to achieve the performance characteristics described above. FIG. 13 shows an exploded perspective view of an exemplary design of a golf club head 1300 in capable of achieving the performance characteristics previously discussed. The golf club head 1300 is made out of the essential components previously discussed in FIG. 1 in terms of a frontal portion 1304 and a rear portion 1306. However, this exploded view of golf club head 1300 allows additional components to be shown in more detail. More specifically, FIG. 13 illustrates that, as often the case in a golf club head construction, the frontal portion 1304 may further be comprised out of a separate component called the striking face insert 1320 to form the striking portion of the golf club head 1300. The rear portion 1306 of the golf club head 1300 is where it gets more interesting. In order to achieve the performance numbers above of a higher MOI-Y, a higher MOI-X, and a lower MOI-Z, a significant amount of mass is re-allocated towards the center of the golf club head away from the perimeter. In order to achieve this, the present invention utilizes four weighting members that are all comprised out of a high density material that have a higher density than the frontal portion 1304 or the rear portion 1306. The four weighting members can be separated into a frontal sole weight 1322, frontal internal weight 1324, rear internal weight 1326, and rear sole weight 1328, and these weighting members may all generally have a material density of greater than 13 g/cc, more preferably greater than about 15 g/cc, and most preferably greater than or about 17 g/cc.

It should be noted that in this exemplary embodiment of the present invention, all of the weighting members 1322, 1324, 1326, and 1328 are all made out of the same material having the same heavy density discussed previously. However, in alternative embodiments of the present invention, different densities of tungsten may be used for different weighting members depending on the design criteria and desired CG location all without departing from the scope and content of the present invention.

FIG. 14 of the accompanying drawings shows a cross-sectional view of a golf club head 1400 in accordance with an exemplary embodiment of the present invention. The cross-sectional view of the golf club head taken across a horizontal plane across the face of the golf club head 1400 to allow some of the relationship between the golf club head 1400 and the various weighting member 1422, 1424, 1426, and 1428 to be shown more clearly. In addition to the weighting members, the cross-sectional view of the golf club head 1400 shown in FIG. 14 also allows the face center 1402 and the CG location 1410 to be re-introduced as it relates to the weighting members. It can be seen from this view that at least one weighting member is located near a central portion of the golf club head in a heel to toe direction, and substantially in line with and behind said face center.

FIG. 15 of the accompanying drawings shows a cross-sectional view of a golf club head 1500 in accordance with an exemplary embodiment of the present invention taken along a vertical plane that passes through the center of the face. This cross-sectional view of the golf club head 1500 shown in FIG. 15 provides a little more information on the interworking relationship between the components. More specifically, FIG. 15 shows a striking face insert 1520 being located in the frontal portion 1504 of the golf club head 1500. In addition to the above, FIG. 15 also shows that the frontal sole weight 1522 is located in a receptacle that is created within the frontal portion 1504. Although not shown in this cross-sectional view in FIG. 15, the frontal internal weight is also located in the frontal portion 1504. Attached to the rear of the frontal portion 1504 is the rear portion 1506. The rear portion 1506 forms the aft body portion of the golf club head 1500, and contains the rear internal weight 1526 and the rear sole weight 1528. These weighting members, combined with the unique materials used to form the frontal portion 1504 and the rear portion 1506, allow the golf club head 1500 to achieve the unique performance characteristics outlined previously.

FIGS. 16 through 20 show various perspective and cross-sectional views of a golf club head 1600 in accordance with an alternative embodiment of the present invention that is capable of achieving the performance goals previously mentioned. Similar to the previous embodiment illustrated by FIGS. 1-3 and 13-15, a lot of weighting member is located near the center of the golf club head 1600 in a heel to toe orientation along the x-axis behind the face center 1602 to help minimize the MOI-Z of the golf club head 1600.

Figure 16:
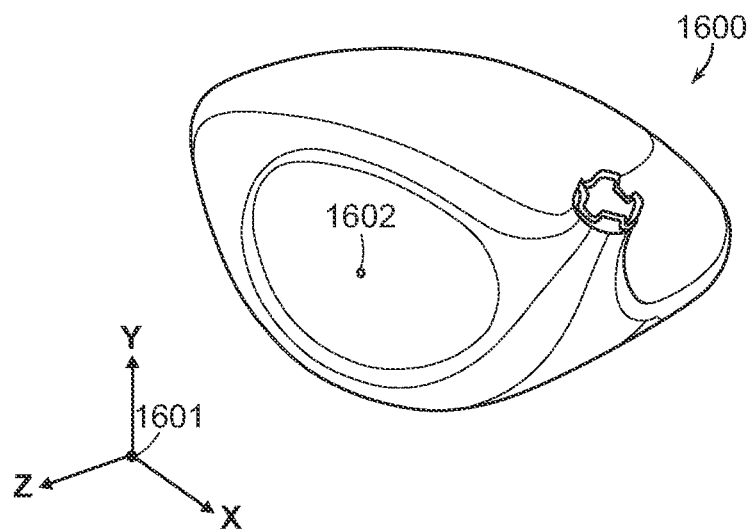
FIG. 16 of the accompany drawings shows a perspective view of a golf club head in accordance with an alternative embodiment of the present invention.

More specifically, FIG. 16 of the accompanying drawings shows a perspective view of a golf club head 1600 in accordance with this alternative embodiment of the present invention. Although not much can be gleamed from this perspective view of the golf club head 1600, it does lay the ground work for the subsequent discussion relating to this particular embodiment of the present invention. Finally, FIG. 16, similar to previous figures that illustrate a golf club head, provides a coordinate system 1601 to guide the subsequent discussions.

Figure 17:
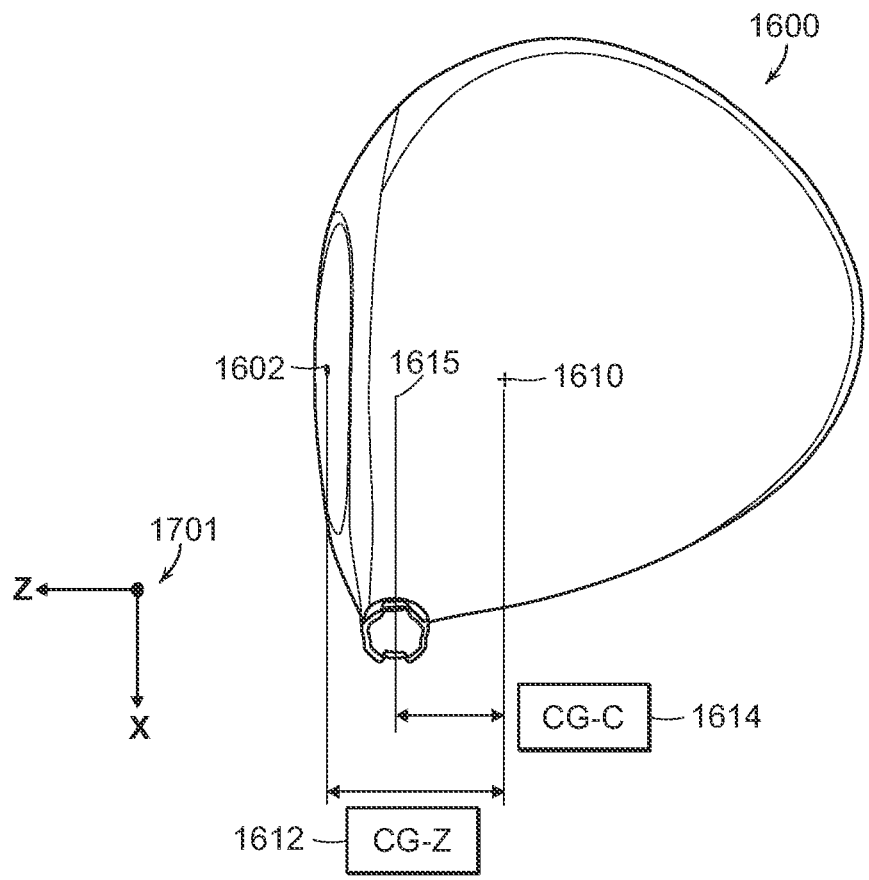
FIG. 17 of the accompanying drawings shows a top view of a golf club head in accordance with an alternative embodiment of the present invention.

FIG. 17 of the accompanying drawings shows a top view of a golf club head 1600 in accordance with this alternative embodiment of the present invention. In this top view, a couple of familiar dimensions are reintroduced here. First and foremost, the top view of the golf club head 1600 shown in FIG. 17 allows the relationship between the face center 1602 and the CG 1610 to be shown in more detail. When measured along the Z-axis, the measurement CG-Z is shown as 1612. The location of the CG, when referenced against the shaft axis 1615 yields another way to measure the CG location along the Z-axis called CG-C 1614. The number ranges for the CG-Z 1612 and CG-C 1614 measurements are not much different from previous discussions, but this embodiment of the present invention provides an alternative way to achieve those targets with a slightly different construction without the need for a multi-material chassis.

Figure 18:
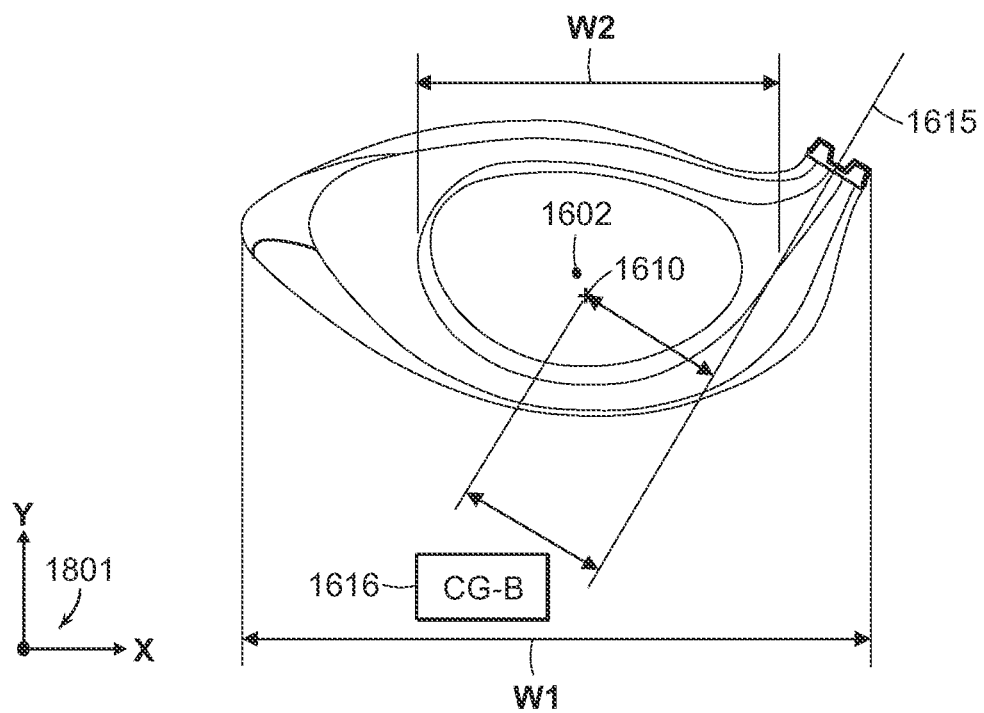
FIG. 18 of the accompanying drawings shows a frontal view of a golf club head in accordance with an alternative embodiment of the present invention.

FIG. 18 of the accompanying drawings shows a frontal view of a golf club head 1600 in accordance with this alternative embodiment of the present invention. In this frontal view, we can see another feature utilized by the present embodiment to help achieve the performance criteria of the current invention. More specifically, FIG. 18 shows that in this embodiment of the present invention, in order to minimize the MOI-Z of the golf club head 1600, weight is removed from the extremities of the golf club head 1600 via a reshaping of the contour at the toe portion of the golf club head 1600. This reshaping of the contour at the toe portion of the golf club head 1600 not only removes weight from the extremities, but also tightens up the face profile of the golf club head 1600 to create a unique performing golf club head 1600.

In addition to illustrating this toe contour profiling, FIG. 18 also shows a CG-B 1616 measurement relating to the shaft axis 1615 similar to the previous discussion. Once again, the CG-B 1616 measurement range is in line as the previous discussion have mentioned, and does not deviate much from the design intent of the present invention.

Figure 19:
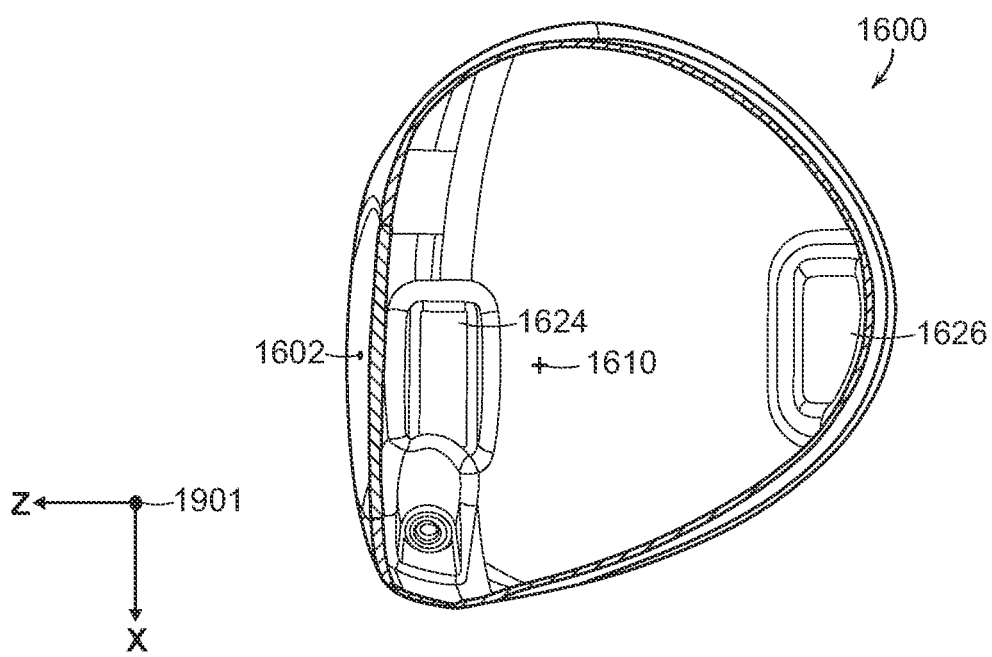
FIG. 19 of the accompanying drawings shows a horizontal cross-sectional view of a golf club head in accordance with an alternative embodiment of the present invention.

FIG. 19 of the accompanying drawings shows a cut open cross-sectional view of a golf club head 1600 in accordance with this alternative embodiment of the present invention taken along a horizontal plane. In this embodiment of the present invention, the overarching theme of placing the weights along the central portion of the golf club head 1600 reemerges again. More specifically, the golf club head 1600 further comprises of a frontal internal weight 1624 and a rear internal weight 1626. These weights, however, different from prior embodiments of the present invention in that they can be made out of the same material as the body portion of the golf club head 1600 such as titanium and be directly cast into the body without departing from the scope and content of the present invention. These weighting members 1624 and 1626 may also be made out of a tungsten type material having a total weight of 20-23 grams to further improve the performance of the golf club head 1600 without departing from the scope and content of the present invention.

Figure 20:
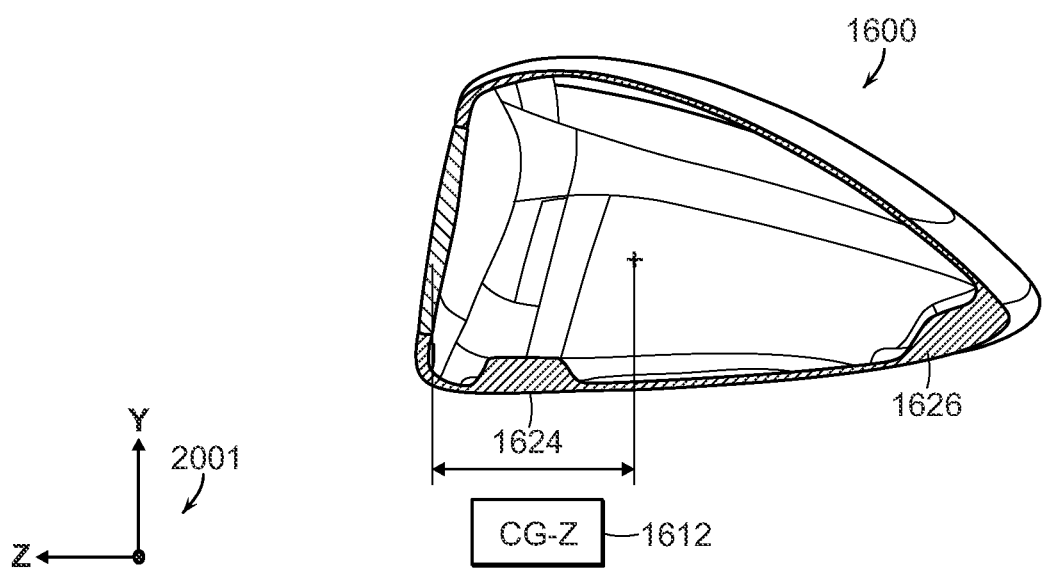
FIG. 20 of the accompanying drawings shows a vertical cross-sectional view of a golf club head in accordance with an alternative embodiment of the present invention.
Figure 21:
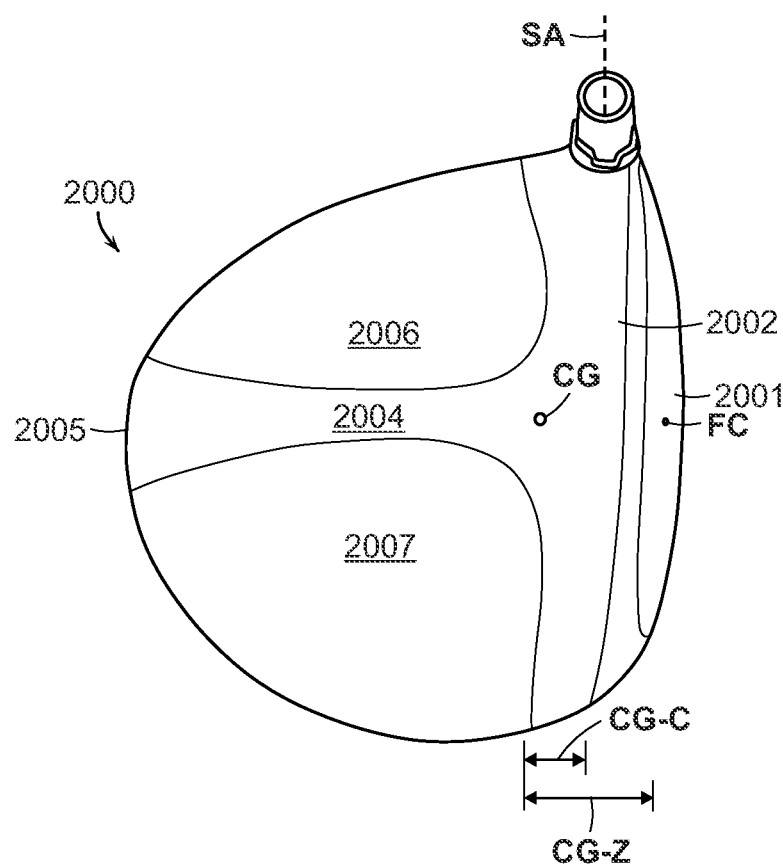
FIG. 21 of the accompanying drawings shows a top view of a golf club head in accordance with an alternative embodiment of the present invention.

FIG. 20 of the accompanying drawings provides another cross-sectional cut open view of the golf club head 1600 in accordance with an alternative embodiment of the present invention taken along a vertical plane. Once again, the measurements here are very similar to the discussion previously relating to prior embodiments and the CG-Z 1612 number remain within the same range as the prior discussion. This cross-sectional cut open view of the golf club head 1600 taken along this line allows the profile and geometry of the frontal internal weight 1624 and the rear internal weight 1626 to be shown more clearly and their relationship together with the body portion of the golf club head 1600.

Referring to FIGS. 21-25 the golf club head 2000 has all of the mass and inertial properties discussed above. Further, the golf club head 2000 comprises frontal portion comprising a striking face 2001 having a face center FC, a crown on the upper portion of the golf club head 2000 and a sole on the bottom portion of the golf club head 2000. The golf club head 2000 further comprises a crown return 2002 and a sole return 2003 as part of the frontal portion and a central body member 2004 that are all formed of metal. The central body member 2004 is located near the central portion of the golf club head 2000 in a heel-to-toe orientation, substantially in line along the z-axis as set forth above, and extends from the crown return 2002 and the sole return 2003 to a back edge 2005 of the golf club head. The golf club head 2000 is further comprised of a heel body member 2006 made of a non-metallic material and coupled to a heel side of the central body member 2004 and the crown return 2002 and the sole return 2003. The golf club head 2000 also includes a toe body member 2007 made of a non-metallic material and coupled to a toe side of the central body member 2004 and the crown return 2002 and the sole return 2003. The heel body member 2006 and the toe body member 2007 are essentially taco shell shaped, taco-shaped, in that they form a portion of the crown and a portion of the sole such that they have a c-shaped cross section. Preferably, as set forth above, the metal portions can be formed of a standard titanium materials such as TI-6-4, Ti-8-1-1, beta-titanium, and others that have a specific gravity of about 4 g/cc to 5 g/cc. Alternatively, the metal portions can be formed of a standard steel materials that have a specific gravity of about 7 g/cc to 9 g/cc The heel body member 2006 and the toe body member 2007 are preferably formed of a standard composite fiber composite laminate, chopped fiber composite generally referred to as fiber-reinforced plastic (FRP), or a composite material such as those disclosed in U.S. Publication No. 2015-0360094, which is incorporated by reference in its entirety herein. Alternatively, the heel body member 2006 and the toe body member 2007 are preferably formed of structural material having a density of less than 3.0 g/cc such as a thermoplastic material such as those disclosed in U.S. application Ser. No. 16/528,210, filed on Jul. 31, 2019, which is incorporated by reference in its entirety herein, polyetherimide (PEI), polyether ether ketone (PEEK), polyphenylene sulfide (PPS), polysulfone (PSU), polyacryletherketone (PEAK), polyetherketoneketone (PEKK) and polyvinyl chloride (PVC). The heel body member 2006 and the toe body member 2007 are preferably formed by compression molding, injection molding or 3D printing.

The golf club head 2000 further has a center of gravity CG that is located a distance back from the face center, CG-z, a vertical distance up from the ground plane, CG-y, a perpendicular distance from the shaft axis, GC-SA, a horizontal distance from the face center toward the heel side, CG-x and a distance back, parallel to the z-axis, from the shaft axis, CG-C. As stated above, in the current invention, the CG-z is generally between about mm to about 40 mm, more preferably between about 26 mm and about 38 mm, and most preferably between about 27 mm and about 36 mm, all measured rearward from the face center FC along the z-axis shown by the coordinate system above. In addition to the CG-z numbers, an alternative measurement method is provided to measure how far back the CG is located within the club head 2000. In this alternative method, the CG is measured from the shaft axis SA, and this measurement is illustrated as CG-C is generally measured to be between about 10 mm to about 30 mm, preferably 10 mm to 25 mm, more preferably between about 12 mm to about 28 mm, and more preferably 12 mm to 23 mm and most preferably between about 14 mm to about 21 mm, all measured rearward from the shaft axis SA along the z-axis direction shown by the coordinate system above.

As stated above, it is important that the strategic location of the CG rearward along the z-axis be correct, irrespective of whether it is measured from the face center FC or the shaft axis SA, for the proper functionality of the current inventive golf club head 2000. If the CG location is too far forward, the golf club head 2000 can have a low MOI-X and MOI-Y and low backspin when contacting a golf ball. However, in the alternative, if the CG location is too far rearward, the golf club head 2000 can produce too much spin to yield desirable results. Hence, the CG location rearward along the z-axis is important for the performance of the golf club head 2000.

Figure 22:
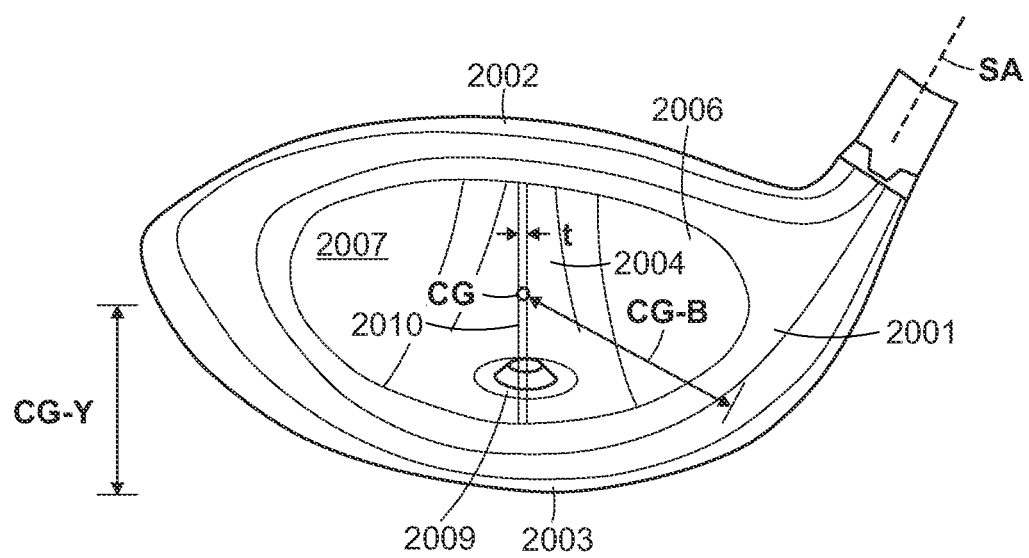
FIG. 22 of the accompanying drawings shows a frontal view of a golf club head in accordance with an alternative embodiment of the present invention.

FIG. 22 of the accompanying drawings shows another important CG measurement that is important to the proper functionality of the current invention. More specifically, FIG. 22, in addition to illustrating all of the components of the golf club head 2000 as previously discussed, shows another measurement of the CG location from the shaft axis SA along an x-y plane. More specifically, FIG. 22 shows a CG measurement that is perpendicular to the shaft axis SA along this x-y plane, called CG-B for the purpose of this application. The CG-B of the golf club head 2000 may generally be between about 32 mm and about 39 mm, more preferably between about 33 mm and about 38 mm, and most preferably about 35 mm.

As shown in FIG. 22, the golf club head 2000 can further include a central support member 2010 such as wall member 2010 that is coupled to a crown portion of the central body member 2004 and a sole portion of the central body member 2004. The wall member 2010 preferably has a thickness t that is between 0.2 mm and 5 mm, and more preferably, between about 0.4 mm and 2 mm.

Figure 23:
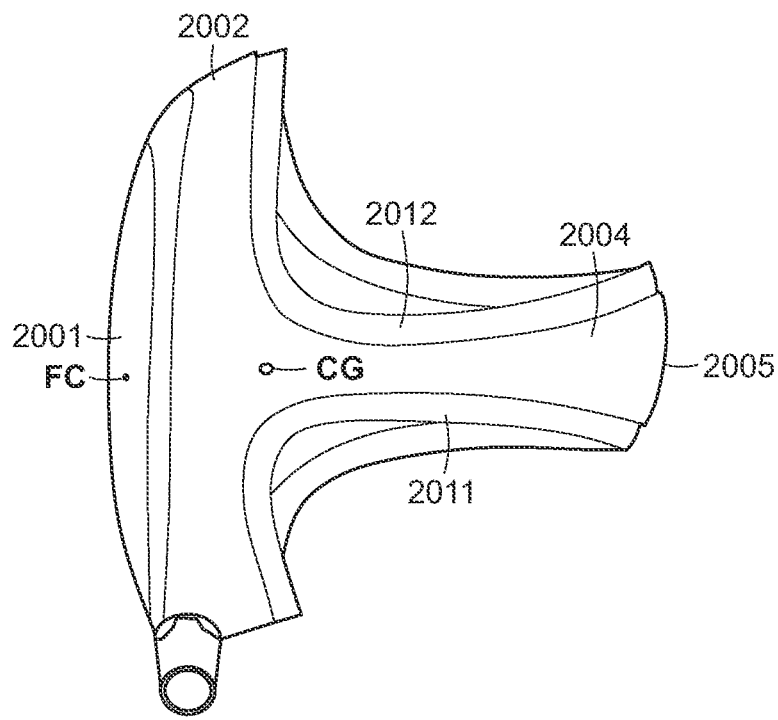
FIG. 23 of the accompanying drawings shows a top view of a body portion of the golf club head in accordance with an alternative embodiment of the present invention shown in FIG. 21.

As shown in FIG. 23, the central body member 2004 preferably has a heel side circumferential attachment edge 2011 and a toe side circumferential attachment edge 2012 for coupling the heel body member 2006 and the toe body member 2007, respectively, to the central body member 2004 and the crown return 2002 and the sole return 2003. The heel side circumferential attachment edge 2011 and the toe side circumferential attachment edge 2012 preferably extend from approximate the crown return 2002 and the sole return 2003 to a back edge 2005 of the golf club head 2000.

Figure 24:
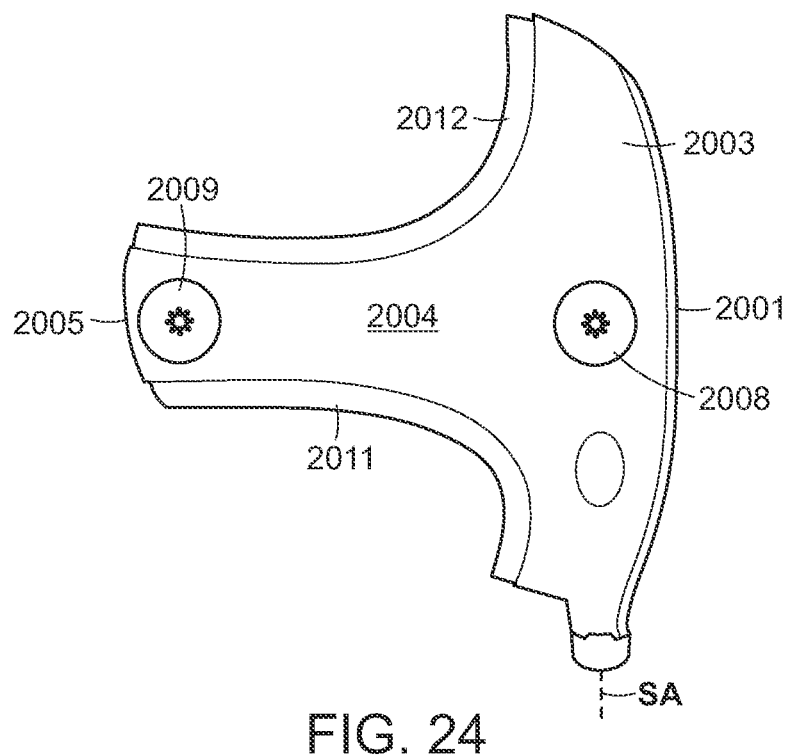
FIG. 24 of the accompanying drawings shows a bottom view of a body portion of the golf club head in accordance with an alternative embodiment of the present invention shown in FIG. 21.

As shown in FIG. 24, the golf club head 2000 can further include at least one weight member 2008 or 2009, and more preferably, includes two weight members 2008 and 2009. The first weight member 2008 is located on the sole portion of the club head, forward near the striking face 2001 and the second weight member 2009 is located on the sole portion of the club head, aft near the back edge 2005. At least one of the weight members 2008 and 2009 may generally have a material density of greater than 13 g/cc, and more preferably greater than about 15 g/cc. The weight members 2008 and 2009 preferably have a mass of between about 0 grams and 50 grams, more preferably between about 3 grams and 35 grams and most preferably between 5 grams and 25 grams. In one embodiment of the invention, the first weight member 2008 has a mass of at least two times the mass of the second weight member 2009. In another embodiment of the invention, the first weight member 2008 has a mass of less than half the mass of the second weight member 2009. More preferably, the weight members 2008 and 2009 are interchangeable so that the CG can be adjusted forward and rearward to control the club head's launch and spin characteristics. Furthermore, the center of the first weight member 2008 is preferably located less than 30 mm from the striking face 2001 along the z-axis and the center of the second weight member 2009 is preferably located less than 20 mm from the back edge 2005 along the z-axis such that the interchangeable weights can have a maximum effect on the spin and launch characteristics of the club head.

Figure 25:
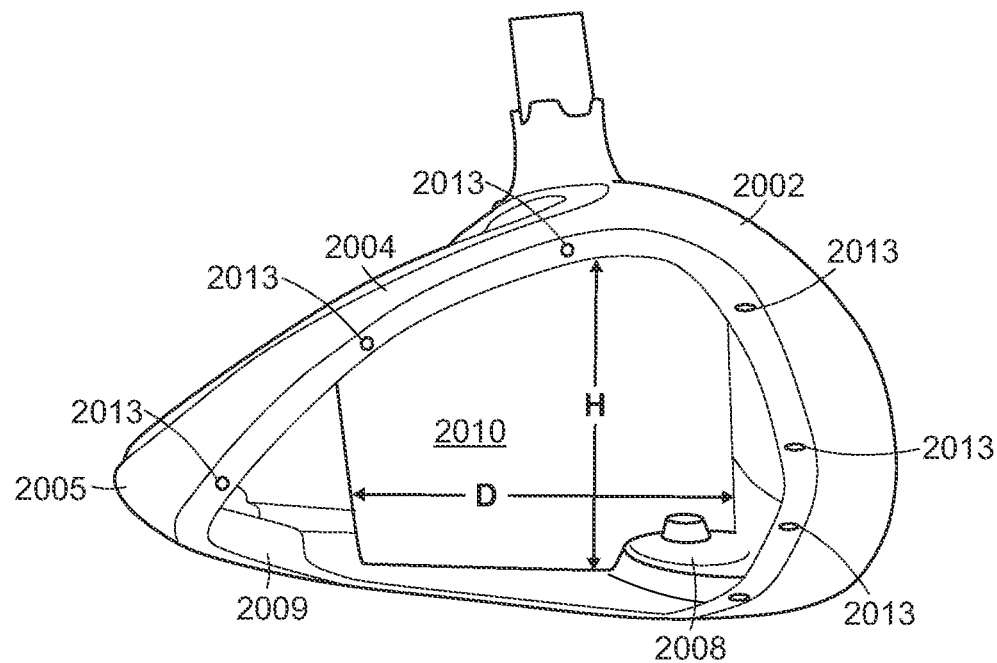
FIG. 25 of the accompanying drawings shows a vertical side view of a body portion of a golf club head in accordance with an alternative embodiment of the present invention.
Figure 26:
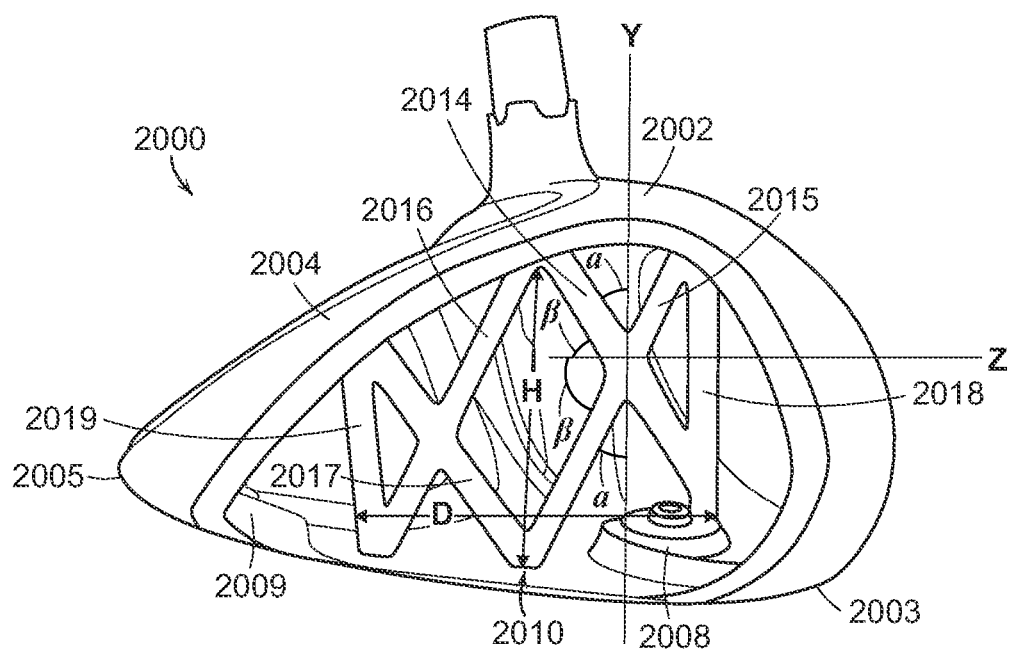
FIG. 26 of the accompanying drawings shows a vertical side view of a body portion of a golf club head in accordance with an alternative embodiment of the present invention.

In one embodiment of the present invention and as shown in FIG. 25, the central support member or wall member 2010 is coupled to a crown portion of the central body member 2004 and a sole portion of the central body member 2004 and extends between the first and second weight members 2008 and 2009. The central support member 2010 preferably has a maximum height H parallel to the y-axis and a maximum depth D parallel to the z-axis. The depth D is preferably greater than the maximum height H. Also shown in FIG. 25, the heel side circumferential attachment edge 2011 and the toe side circumferential attachment edge 2012 for coupling the heel body member 2006 and the toe body member 2007 to the central body member 2004 can include a plurality of recesses or apertures 2013 that adhesive can enter into and better lock the components together. Alternatively, the heel side circumferential attachment edge 2011 and the toe side circumferential attachment edge 2012 may have a plurality of protrusions on the outer surface to create a gap between the heel body member 2006 and the toe body member 2007 to the central body member 2004 such that an adhesive can fill the gap and create a stronger bond therebetween.

In another embodiment of the present invention, the golf club head's central support member 2010 can be comprised of a plurality of strut members 2014, 2015, 2016, 2017, 2018 and 2019 that extend form the crown to the sole of the central body member 2004 between the two weight members 2008 and 2009. Again, the central support member 2010 preferably has a maximum height H parallel to the y-axis and a maximum depth D parallel to the z-axis. The depth D is preferably greater than the maximum height H. Preferably, a first angled strut member 2014 extends from a crown portion of the central body member 2004 to the sole and a second angled strut member 2015 extends from a sole portion of the central body member 2004 to the crown, and the first and second angled strut members 2014 and 2015 preferably cross each other. Preferably, the first and second angled strut members 2014 and 2015 extend at an angle $\alpha$ of between 15 degrees and 75 degrees from the y-axis and an angle $\beta$ of between 15 degrees and 75 degrees from the z-axis. More preferably, the first and second angled strut members 2014 and 2015 extend at an angle $\alpha$ of between 15 degrees and 45 degrees from the y-axis and an angle $\beta$ of between 45 degrees and 75 degrees from the z-axis. The golf club head 2000 can further comprise a third angled strut member 2016 that extends from a crown portion of the central body member 2004 to the sole and a fourth angled strut member 2017 that extends from a sole portion of the central body member 2004 to the crown, and the third and fourth angled strut members cross each other. The third and fourth angled strut members also extend at angles $\alpha$ and $\beta$ of between 15 degrees and 75 degrees from both the y-axis and the z-axis respectively. Preferably, the third angled strut member 2016 is coupled to the first angled strut member 2014 at the crown and the fourth angled strut member 2017 is coupled to the second angled strut member 2015 at the sole. Furthermore, preferably, the third angled strut member 2016 is substantially parallel to the second angled strut member 2015 and the fourth angled strut member 2017 is substantially parallel to the first angled strut member 2014. The golf club head 2000 can further comprise a vertical strut member 2018 extending vertically, substantially parallel to the y-axis, between the first angled strut member 2014 and the second angled strut member 2015 approximate the first weight member 2008. Even more preferably, the golf club head 2000 can further comprise a second vertical strut member 2019 extending vertically, substantially parallel to the y-axis, between the fourth angled strut member 2017 and the third angled strut member 2016 adjacent to the second weight member 2009.

The advantage of the central support member 2010, either in the form of the wall member 2010 or the angled strut members 2014, 2015, 2016 and 2017 is that it prevents the crown portion of the central body member 2004 from deflecting relative to the sole portion of the central body member 2004 in the y-axis and also prevents the portions from shearing with respect to each other in the z-axis.

The advantage of multiple weight members 2008 and 2009 is that the weight members can have equal mass, for example between 10 and 15 grams each, such that the CG of the club head 2000 is in a neutral position. However, the weight members 2008 and 2009 can also be comprised of a heavy weight, for example greater than 15 grams, and a light weight, for example less than 10 grams, such that the CG can be moved forward or back depending on the placement of the weights. With the heavy weight located in the aft weight member 2009, the MOI-Y is increased and is preferably greater than about 450 kg-mm$^2$. Thus, in a preferred golf club head 2000, the MOI-Y is greater than or equal to approximately 2 times the MOI-Z. Conversely, when the heavy weight is in the forward weight member 2008, the CG-C can be significantly decreased. For example, a preferred golf club head 2000 can have a GC-C of between 14 mm to 21 mm.

The advantages of the club head 2000 discussed above can also apply to fairway woods and hybrids. In those embodiments, it is understood that the numerical values for the club properties will be lower and the metal will be generally steels and high strength steels known in the art. However, the construction of the golf club head 2000 can be easily applied to these smaller heads.

Figure 27:
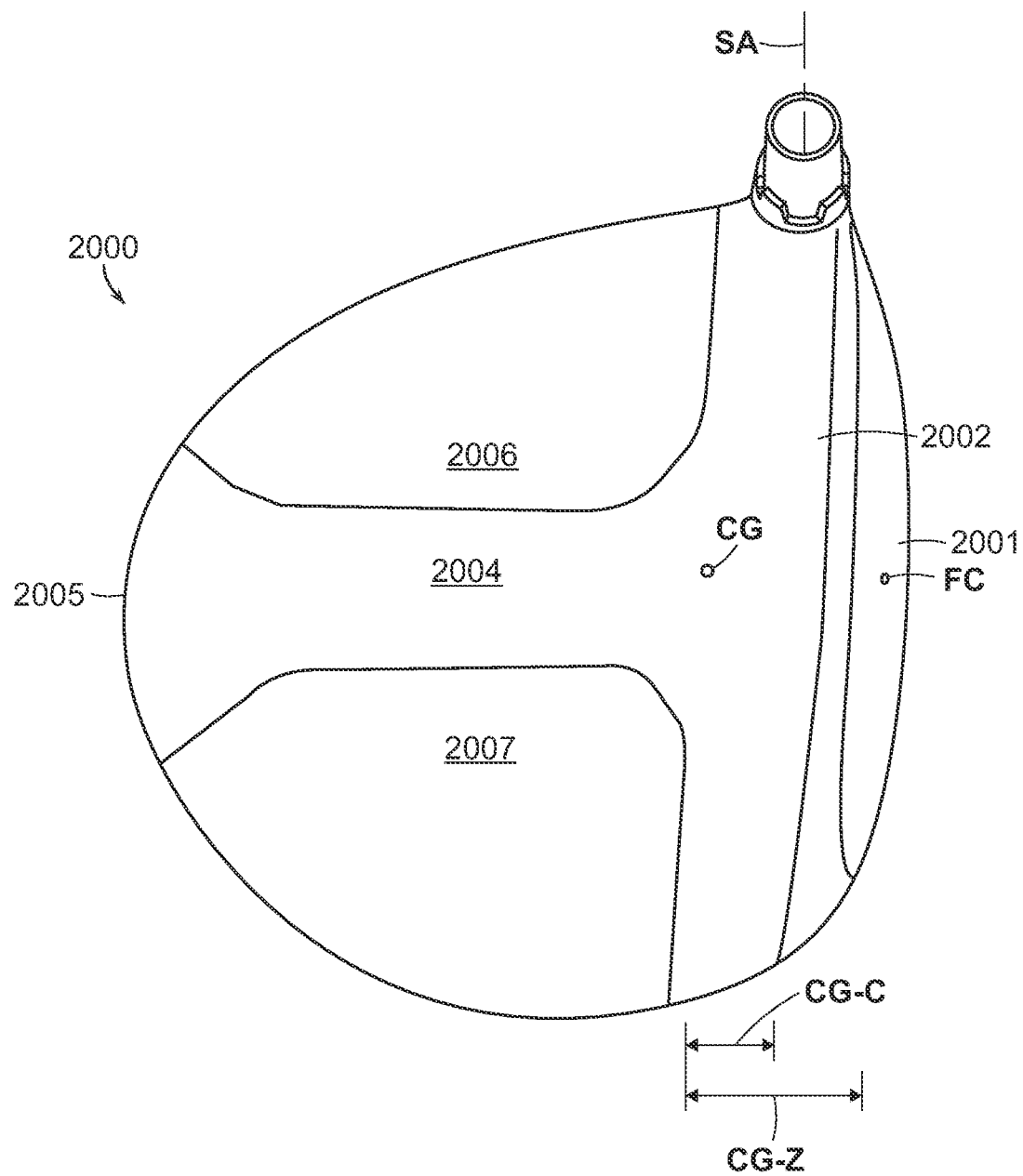
FIG. 27 of the accompanying drawings shows a top view of a golf club head in accordance with an alternative embodiment of the present invention.
Figure 28:
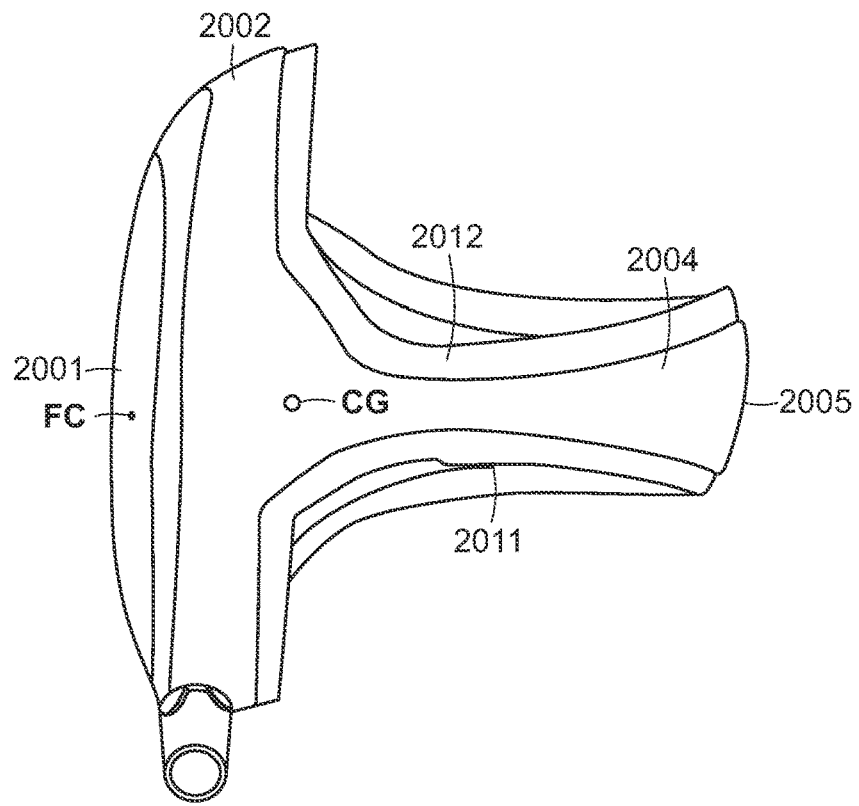
FIG. 28 of the accompanying drawings shows a top view of a body portion of the golf club head in accordance with an alternative embodiment of the present invention shown in FIG. 27.
Figure 29:
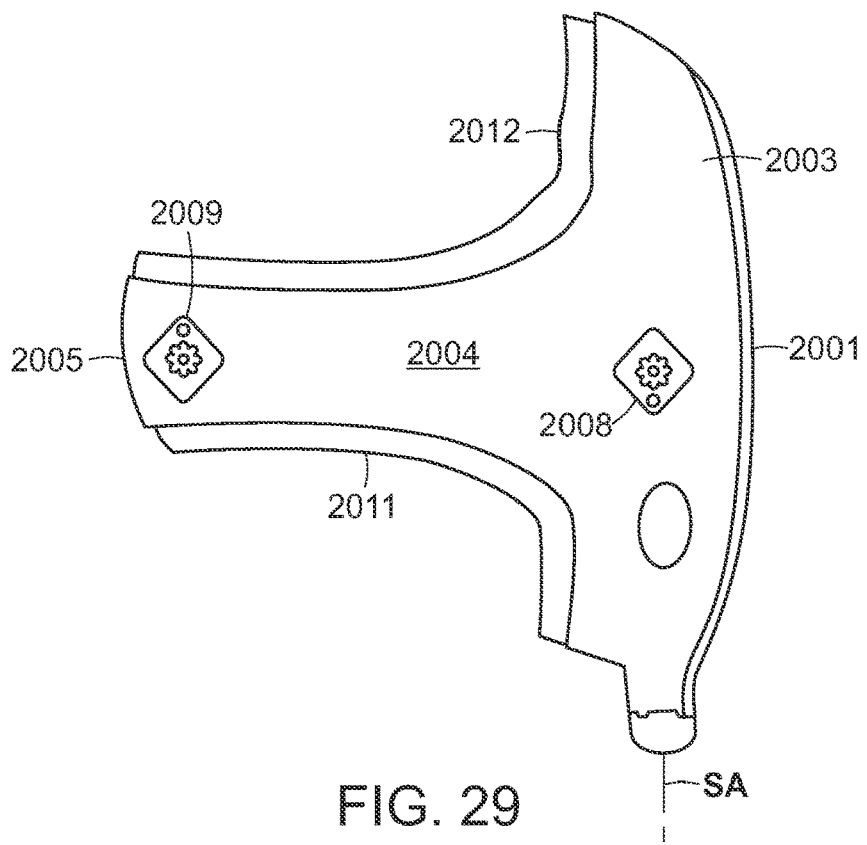
FIG. 29 of the accompanying drawings shows a bottom view of a body portion of the golf club head in accordance with an alternative embodiment of the present invention shown in FIG. 27.
Figure 30:
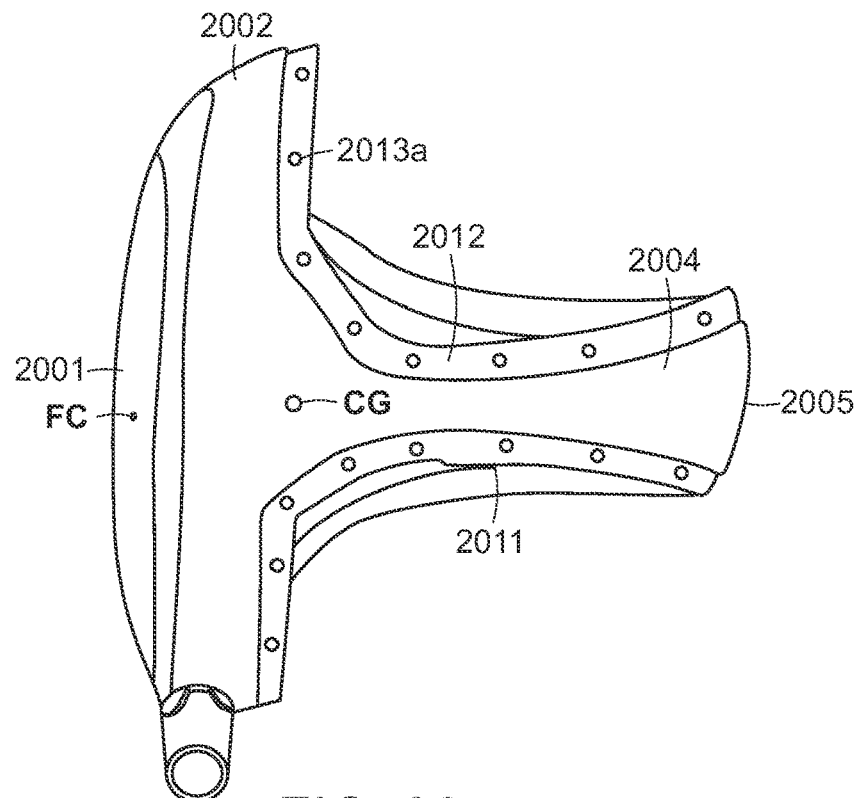
FIG. 30 of the accompanying drawings shows a top view of a body portion of the golf club head in accordance with an alternative embodiment of the present invention shown in FIG. 27.

Referring to FIGS. 27-29 the golf club head 2000 has all of the mass and inertial properties discussed above. Further, the golf club head 2000 comprises frontal portion comprising a variable thickness striking face 2001 having a maximum thickness at the face center FC, a crown on the upper portion of the golf club head 2000 and a sole on the bottom portion of the golf club head 2000. The golf club head 2000 further comprises a crown return 2002 and a sole return 2003 adjacent the striking face 2001 as discussed above and a central body member 2004 that are all formed of metal. The central body member 2004 is located near the central portion of the golf club head 2000 in a heel-to-toe orientation, substantially in line along the z-axis as set forth above, and extends from the crown return 2002 and the sole return 2003 to a back edge 2005 of the golf club head 2000. As discussed above, the golf club head 2000 is further comprised of a heel body member 2006 made of a non-metallic material and coupled to a heel side of the central body member 2004 along the heel edge 2011 and a toe body member 2007 made of a non-metallic material is coupled to a toe side of the central body member 2004 along the toe edge 2012. The central body member 2004 can include a plurality of protrusions 2013a that create an adhesive filled gap and better lock the components together. The heel body member 2006 and the toe body member 2007 are essentially taco shell shaped, taco-shaped, in that they form a portion of the crown and a portion of the sole such that they have a c-shaped cross section. Preferably, as set forth above, the metal portions can be formed of a standard titanium materials such as TI-6-4, Ti-8-1-1, beta-titanium, and others that have a specific gravity of about 4 g/cc to 5 g/cc. The heel body member 2006 and the toe body member 2007 are preferably formed of a standard composite fiber composite laminate, chopped fiber composite generally referred to as fiber-reinforced plastic (FRP), or a composite material such as those disclosed in U.S. Publication No. 2015-0360094, which is incorporated by reference in its entirety herein. Alternatively, the heel body member 2006 and the toe body member 2007 are preferably formed of a thermoplastic material such as those disclosed in U.S. application Ser. No. 16/528,210, filed on Jul. 31, 2019, which is incorporated by reference in its entirety herein, polyetherimide (PEI), polyether ether ketone (PEEK), polyphenylene sulfide (PPS), polysulfone (PSU), polyacryletherketone (PEAK), polyetherketoneketone (PEKK) and polyvinyl chloride (PVC). The heel body member 2006 and the toe body member 2007 are preferably formed by compression molding, injection molding or 3D printing.

In a most preferred embodiment, the heel body member 2006 and the toe body member 2007 are preferably formed from a high crystallinity PPS, that is a PPS in which the crystallinity is greater than 40%, and more preferably, greater than about 50% as measured using differential scanning calorimetry (DSC) at a heating rate of 20° C./min. The crystallinity percentage can be calculated using the following equation:

$$\% \text{ crystallinty} = \Delta H_{sample} / \Delta H_{reference} \times 100$$

where: $\Delta H_{sample}$ is the sample melting enthalpy with unknown crystallinity percentage and $\Delta H_{reference}$ is the sample melting enthalpy with the known crystallinity. For PPS, 76.5 J/g may be utilized as the $\Delta H_{reference}$.

In order to increase the crystallinity level in PPS, it is recommended that the material be injection molded into molds that are at a temperature of greater than 115° C. and more particularly in a mold that is between about 125° C. and 135° C. In the most preferred embodiment, the PPS crystallinity is between about 50% and 70%. The material preferably has a uniform thickness of about 0.5 mm to about 2 mm. However, in one embodiment, the toe body member 2007 has a thickness that is less than the thickness of the heel body member 2006. In another embodiment, the toe body member 2007 and the heel body member 2006 vary such that they are thinnest on the crown portion and thicker on the sole portion. In this embodiment, the crown portions of the toe body member 2007 and the heel body member 2006 have a thickness that is preferably between about 0.5 mm and 1 mm and the sole portions of the toe body member 2007 and the heel body member 2006 are between about 1 mm and 2 mm thick.

The golf club head 2000 further has a center of gravity CG that is located a distance back from the face center, CG-z, a vertical distance up from the ground plane, CG-y, a perpendicular distance from the shaft axis, GC-SA, a horizontal distance from the face center toward the heel side, CG-x and a distance back, parallel to the z-axis, from the shaft axis, CG-C. As stated above, in the current invention, the CG-z is generally between about 25 mm to about 40 mm, more preferably between about 26 mm and about 38 mm, and most preferably between about 27 mm and about 36 mm, all measured rearward from the face center FC along the z-axis shown by the coordinate system above. In addition to the CG-z numbers, an alternative measurement method is provided to measure how far back the CG is located within the club head 2000. In this alternative method, the CG is measured from the shaft axis SA, and this measurement is illustrated as CG-C is generally measured to be between about 10 mm to about 25 mm, more preferably between about 12 mm to about 23 mm, and most preferably between about 14 mm to about 21 mm, all measured rearward from the shaft axis SA along the z-axis shown by the coordinate system above.

As stated above, it is important that the strategic location of the CG location rearward along the z-axis be correct, irrespective of whether it is measured from the face center FC or the shaft axis SA, for the proper functionality of the current inventive golf club head 2000. If the CG location is too far forward, the golf club head 2000 can have a low MOI-X and MOI-Y and low backspin when contacting a golf ball. However, in the alternative, if the CG location is too far rearward, the golf club head 2000 can produce too much spin to yield desirable results. Hence, the CG location rearward along the z-axis is important for the performance of the golf club head 2000.

Figure 31:
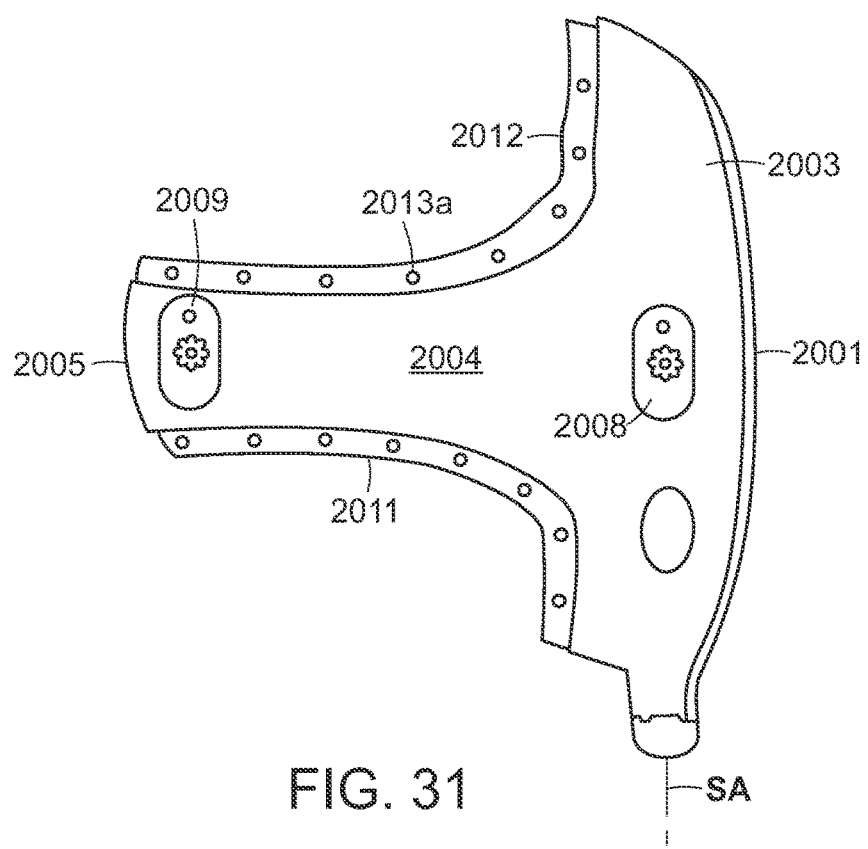
FIG. 31 of the accompanying drawings shows a bottom view of a body portion of the golf club head in accordance with an alternative embodiment of the present invention.

As shown in FIGS. 29 and 31, the weight member 2008 has less mass than weight member 2009 and is preferably made from steel (or at least a material that has a lower density that the density of weight member 2009). The first weight member 2008 can be located on the forward portion of the sole return 2003, near the striking face 2001 and the second weight member 2009 located on the sole portion of the golf club head 2000, aft near the back edge 2005. At least one of the weight members 2008 and 2009 may generally have a material density of greater than 13 g/cc, more preferably greater than about 15 g/cc, and most preferably about 17 g/cc. Preferably, at least one of the weight members 2008 and 2009 may generally have a material density of greater than 2 g/cc and less than about 9 g/cc, and most preferably between about 4 g/cc and about 8 g/cc. The weight members 2008 and 2009 preferably have a mass of between about 0 grams and 50 grams, and more preferably between about 5 grams and 25 grams. In one embodiment of the invention, the first weight member 2008 has a mass of at least two times the mass of the second weight member 2009. In another embodiment of the invention, the first weight member 2008 has a mass of less than half the mass of the second weight member 2009. More preferably, the weight members 2008 and 2009 are the same shape and volume such that they are interchangeable so that the CG of the golf club head 2000 can be adjusted forward and rearward to control the club head's launch and spin characteristics. Furthermore, the center of the first weight member 2008 is preferably located less than 30 mm from the striking face 2001 along the z-axis direction and the center of the second weight member 2009 is preferably located less than 20 mm from the back edge 2005 along the z-axis direction such that the interchangeable weights can have a maximum effect on the spin and launch characteristics of the club head. More preferably, the center of the first weight member 2008 is preferably located less than 25 mm from the striking face 2001 along the z-axis direction and the center of the second weight member 2009 is preferably located less than mm from the back edge 2005 along the z-axis direction.

Figure 32:
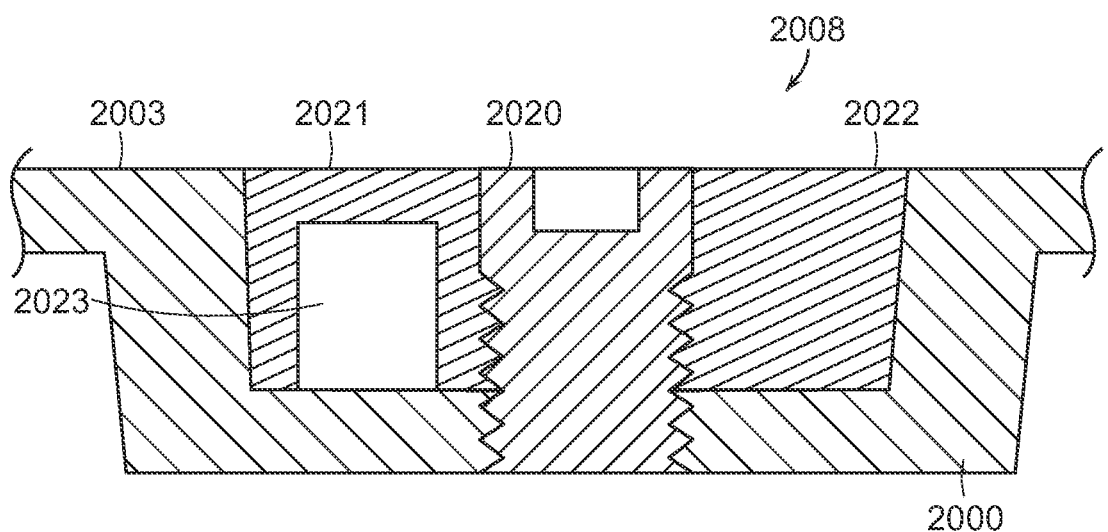
FIG. 32 of the accompanying drawings shows a cross-sectional view of a first weight member shown in FIG. 31.

As shown in FIG. 32, the first weight member 2008 is preferably releasably coupled to the sole return 2003 portion of the golf club head 2000 by a fastener 2020. The first weight member 2008 may generally have a material density of greater than 4 g/cc, more preferably greater than about 7 g/cc, and most preferably between about 7 g/cc and 8 g/cc. The first weight member preferably has a light side 2021 and a heavy side 2022. The heavy side 2022 is preferably substantially solid and as shown in FIGS. 29 and 31 is the side identified with indicia such as with a dot. In a preferred embodiment, the first weight member 2008 has a hollow portion 2023 that forms the light side 2021 of the weight member 2008.

Figure 33:
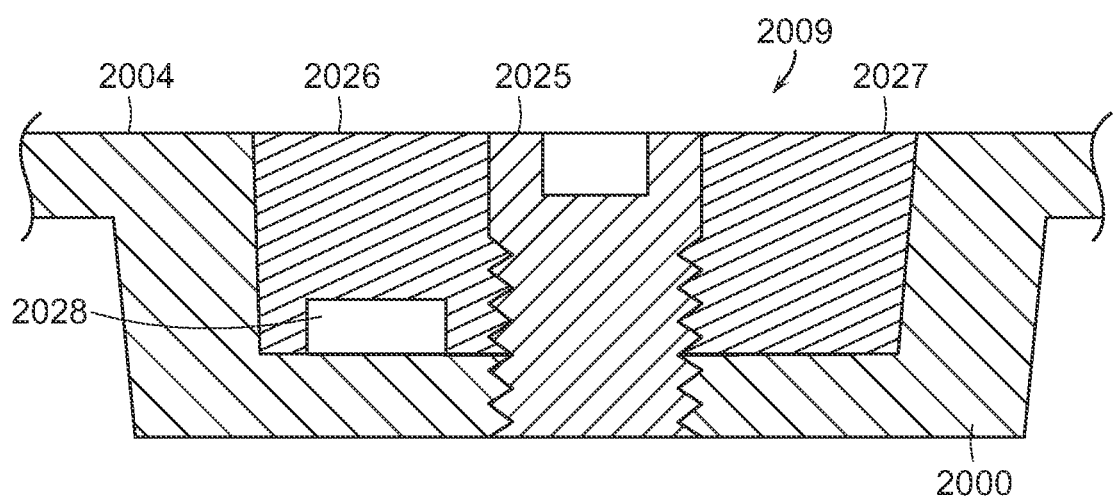
FIG. 33 of the accompanying drawings shows a cross-sectional view of a second weight member shown in FIG. 31.

As shown in FIGS. 33, the second weight member 2009 is also preferably releasably coupled to the sole portion of the central body member 2004 portion of the golf club head 2000 by a fastener 2025. The second weight member 2009 may generally have a material density of greater than 13 g/cc, more preferably greater than about 15 g/cc, and most preferably greater than or equal to about 17 g/cc. The second weight member 2009 preferably has a light side 2026 and a heavy side 2027. The heavy side 2027 is preferably substantially solid and as shown in FIGS. 29 and 31 is the side identified with indicia such as with a dot. In a preferred embodiment, the weight member 2009 has a hollow portion 2028 that forms the light side 2026 of the second weight member 2009.

More preferably, at least one or both of the weight members 2008 or 2009 are comprised of a light side 2021 and 2026 that includes a hollow portion 2023 and 2028 and a heavy side 2022 and 2027 that is substantially solid or is solid enough that the mass on the heavy side is greater than the mass on the light side. Alternatively, at least one or both of the weight members 2008 or 2009 are comprised of a light side 2021 and 2026 that includes a hollow portion 2023 and 2028 that can be filled with a material having a density of less than 4 g/cc and a heavy side 2022 and 2027 that is a hollow portion that is filled with a material having a density of greater than about 7 g/cc and more preferably greater than or equal to about 15 g/cc. As shown in FIGS. 29 and 31, the weight member 2008 has less mass than weight member 2009 and is preferably made from steel (or at least a material that has a lower density that the density of weight member 2009). More preferably, the first weight member 2008 has a mass of about 7 g and 14 g and the second weight member has a mass of between about 15 g and 22 g. Most preferably, the first weight member 2008 and the second weight member 2009 can be interchanged in the front and aft locations as shown in FIGS. 29 and 31 to move the CG-C by approximately 1 mm to 5 mm and most preferably by about 2.5 mm to 3.5 mm. In the most preferred embodiment, the CG-C can be between about 14 mm and 21 mm when the first weight member 2008 is in the aft location adjacent the back edge 2005 and the CG-C can be between about 22 mm and 30 mm when the first weight member 2008 is in the forward position adjacent the striking face 2001. Further, the first weight member 2008 and the second weight member 2009 preferably have approximately the same difference in mass between the light sides 2021 and 2026 and the heavy sides 2022 and 2027. Preferably, the difference in mass between the light sides 2021 and 2026 and the heavy sides 2022 and 2027 is between about 4 g and 8 g. Thus, if one of the weight members has the heavy side toward the heel in the x-axis direction and the other has the heavy side toward the toe in the x-axis direction, the CG of the golf club head 2000 can be neutral in the x-axis direction as shown in FIG. 29. However, if the weight members have both of their heavy sides 2022 and 2027 toward the toe or the heel in in the x-axis direction, the CG can be moved away from the neutral position along the x-axis direction toward the toe or heel, respectively. Preferably, the golf club head CG can be moved at least 0.5 mm toward the toe or the heel from the neutral location and more preferably, between about 0.7 mm and 1.5 mm. As shown in FIG. 31, both the first weight member 2008 and the second weight member 2009 have the heavy sides 2022 and 2027 toward the toe in the x-axis direction such that the golf club head CG is moved toward the toe by about 1 mm from the neutral position GC-n. These weight members can both be rotated about the fastener such that the CG is moved toward the heel by about 1 mm from the neutral position CG-n and 2 mm from the far toe CG position as shown in FIG. 31.

Figure 34:
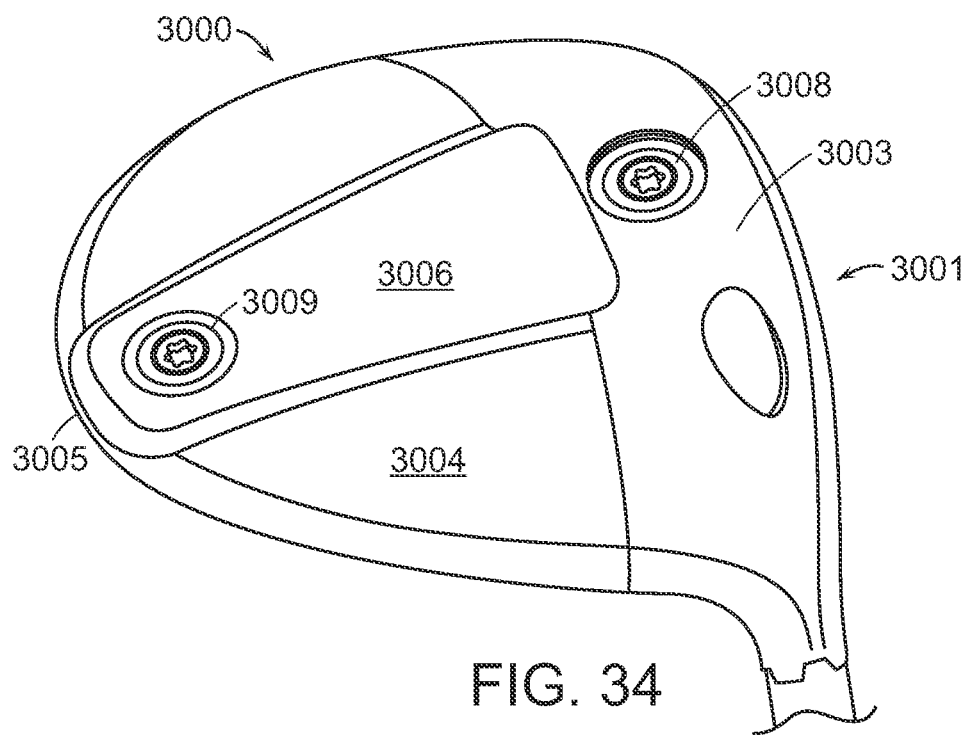
FIG. 34 of the accompanying drawings shows a bottom perspective view of another embodiment of a golf club head in accordance with the present invention.

FIGS. 34 through 37 show different perspective and cross-sectional views of golf club heads and their internal components that are used to achieve the performance characteristics described above. FIG. 34 shows a perspective view of an exemplary design of a golf club head 3000 that capable of achieving the performance characteristics previously discussed with respect to the embodiments in FIGS. 1-3 and 13-15 in particular. The golf club head 3000 is comprised of the essential components previously discussed in FIGS. 1 and 13 in terms of a frontal portion having a striking face 3001, a crown return 3002 and a sole return 3003 and a rear portion 3004 comprised of an aft body. In order to achieve the performance numbers above of a higher MOI-Y, a higher MOI-X, and a lower MOI-Z, a significant amount of mass is allocated towards the center of the golf club head away from the perimeter. In order to achieve this, the present invention utilizes two weighting members that are preferably comprised of high density materials that have a higher density than the frontal portion 3001, 3002 and 3003 and the rear portion 3004. Preferably, as set forth above, the frontal portion 3001, 3002 and 3003 can be formed of a standard titanium material such as TI-6-4, Ti-8-1-1, beta-titanium, and others that have a density of about 4 g/cc to 5 g/cc. The rear portion 3004 is preferably formed of a standard composite fiber composite laminate, chopped fiber composite generally referred to as fiber-reinforced plastic (FRP), or a composite material such as those disclosed in U.S. Publication No. 2015-0360094, which is incorporated by reference in its entirety herein. Alternatively, the rear portion 3004 is preferably formed of structural material having a density of less than 3.0 g/cc such as a thermoplastic materials such as those disclosed in U.S. application Ser. No. 16/528,210, filed on Jul. 31, 2019, which is incorporated by reference in its entirety herein, polyetherimide (PEI), polyether ether ketone (PEEK), polyphenylene sulfide (PPS), poly sulfone (PSU), polyacryletherketone (PEAK), polyetherketoneketone (PEKK) and polyvinyl chloride (PVC). The rear portion 3004 is preferably formed by compression molding, injection molding or 3D printing. Additionally, the golf club head 3000 includes a sole plate member 3006 secured to an outer surface of the rear portion 3004. In a preferred embodiment, the sole plate member 3006 is also formed from standard titanium materials such as TI-6-4, Ti-8-1-1, beta-titanium, and others that have a density of about 4 g/cc to 5 g/cc. In another preferred embodiment, the sole plate member 3006 is formed from stainless steel or similar material having a density of about 7 g/cc to 8 g/cc.

The golf club head 3000 also includes weight members 3008 and 3009. In a first embodiment, the weight members 3008 and 3009 can have equal mass, for example between 10 and 15 grams each, such that the CG of the club head 3000 is in a neutral position along the z-axis direction. However, the weight members 3008 and 3009 can also be comprised of a heavy weight, for example greater than 15 grams, and a light weight, for example less than 10 grams, such that the CG can be moved forward or back along the z-axis direction depending on the placement of the weights. With the heavy weight located in the aft weight member 3009, the MOI-Y is increased and is preferably greater than about 450 kg-mm$^2$. Thus, in a preferred golf club head 3000, the MOI-Y is greater than or equal to approximately 2 times the MOI-Z. Conversely, when the heavy weight is in the forward weight member 3008, the CG-C can be significantly decreased. For example, a preferred golf club head 3000 can have a GC-C of between 14 mm to 21 mm.

Figure 35:
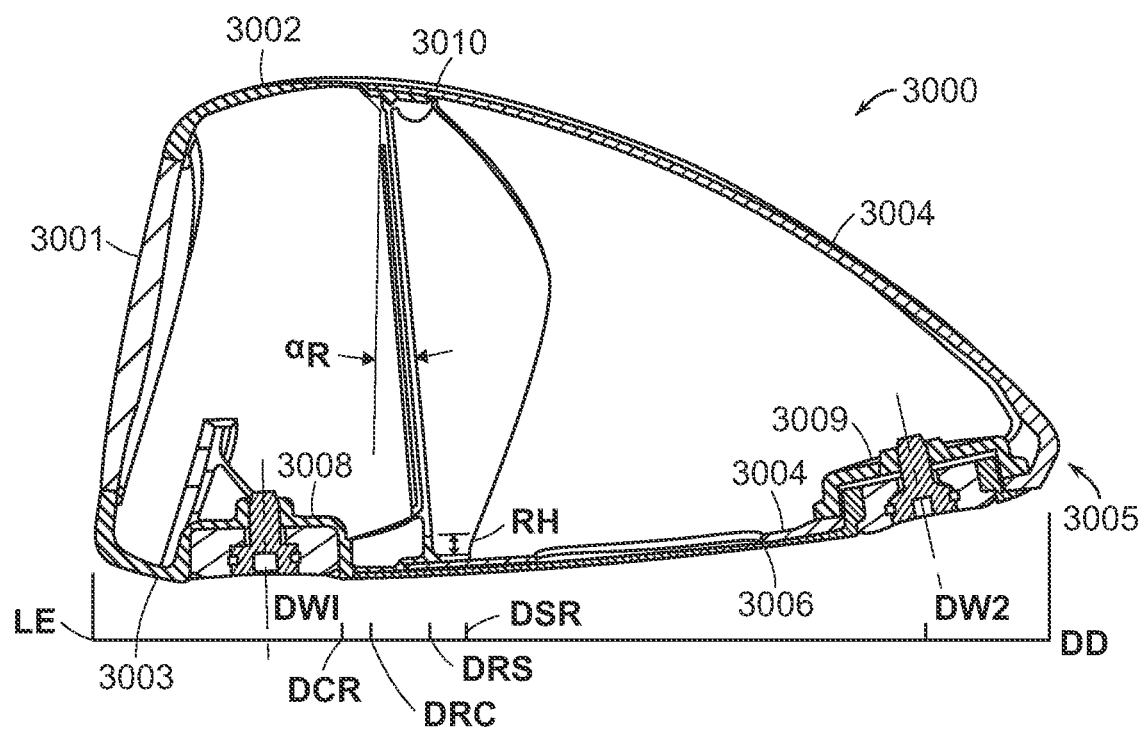
FIG. 35 of the accompanying drawings shows a cross-sectional view of the golf club head in accordance with an alternative embodiment of the present invention shown in FIG. 34.

Referring to FIG. 35, the golf club head 3000 further includes an internal rib member 3010 that is located in the frontal portion. The rib member 3010 is preferably located near or at the overlapping juncture of the frontal portion and the rear portion 3004. Preferably, the depth DD of the golf club head from the leading edge LE to the back edge 3005 is between 105 mm and 125 mm, and more preferably between about 118 mm and 122 mm. The distance of the crown return DCR from the leading edge to where the crown return 3002 abuts the rear portion 3004 is preferably about 20 mm and 35 mm and more preferably between about 30 mm and 34 mm. The distance of the sole return DSR from the leading edge to where the back end of the sole return 3003 is preferably about 24 mm and 44 mm and more preferably between about 35 mm and 42 mm. The rib member 3010 is therefore preferably located a distance from the leading edge that is between the DCR and the DSR or between 20 mm and 44 mm. Most preferably, the rib member 3010 is angled such that the distance from the leading edge to the crown portion of the rib member 3010 (at the center of the crown in the heel-to-toe direction, back from the face center) DRC is less than the distance from the leading edge to the sole portion of the rib member 3010 (at the center of the sole in the heel-to-toe direction, back from the face center) DRS. More preferably, DRC is preferably between 22 mm and 33 mm and DRS is between 26 mm and 42 mm and is at least 10% greater than DRC. Thus, the rib member 3010 forms an angle $\alpha_R$ that is between about 2° and 10° from the vertical plane at the DRC to a point on the sole at the DRS. The rib member 3010 has a rib height RH (the height of the rib member from the inner surface of the frontal portion) that also preferably varies from the crown center to the sole center and at the heel and toe. Most preferably, the rib height RH is between about 2 mm and 8 mm and is greatest at the sole center and shortest at the heel and toe. Most preferably, the rib member 3010 has a rib height RH of about 5 mm at the sole center, 4 mm at the crown center and is 3 mm to 3.5 mm at the heel and toe.

The center of the first weight member 3008 is preferably located a distance DW1 from the leading edge LE of about 15 mm to 25 mm. The center of the second weight member 3009 is preferably located a distance DW2 from the leading edge LE of about 80 mm to 115 mm.

Figure 36:
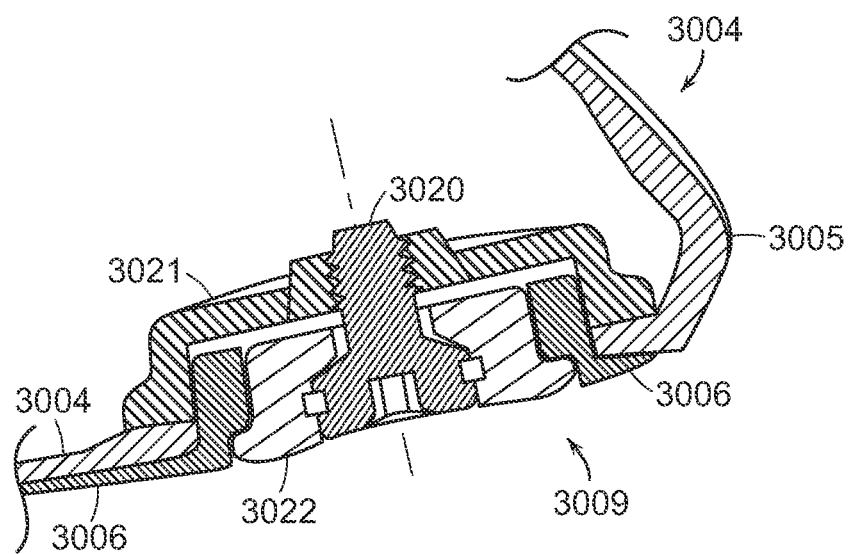
FIG. 36 of the accompanying drawings shows a close-up, cross-sectional view of the golf club head in accordance with an alternative embodiment of the present invention shown in FIG. 34.
Figure 37:
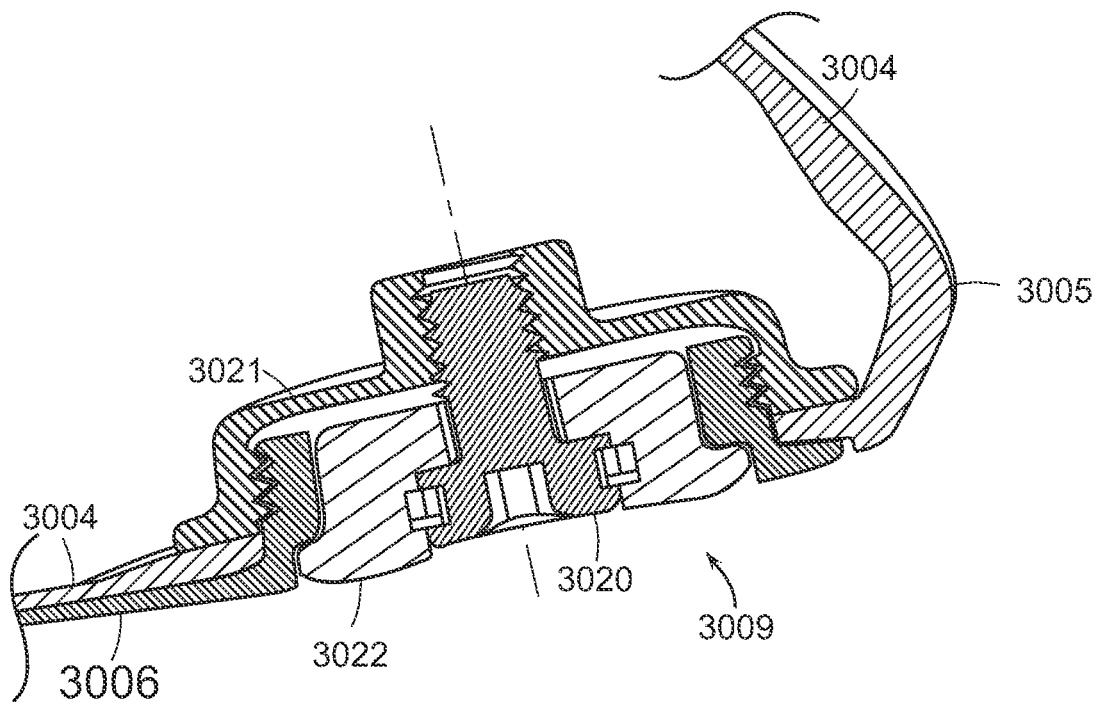
FIG. 37 of the accompanying drawings shows a close-up, cross-sectional view of the golf club head in accordance with an alternative embodiment of the present invention shown in FIG. 34.
Figure 38:
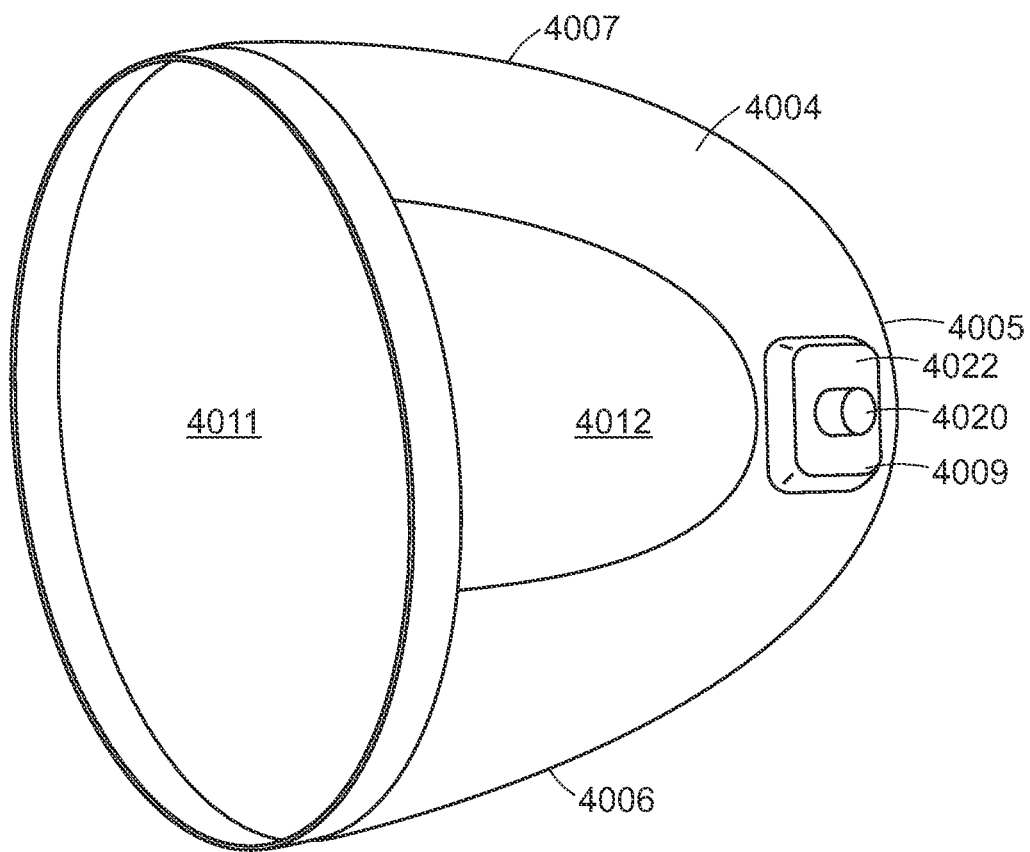
FIG. 38 of the accompanying drawings shows a bottom perspective view of another embodiment of a golf club head rear portion in accordance with the present invention.
Figure 39:
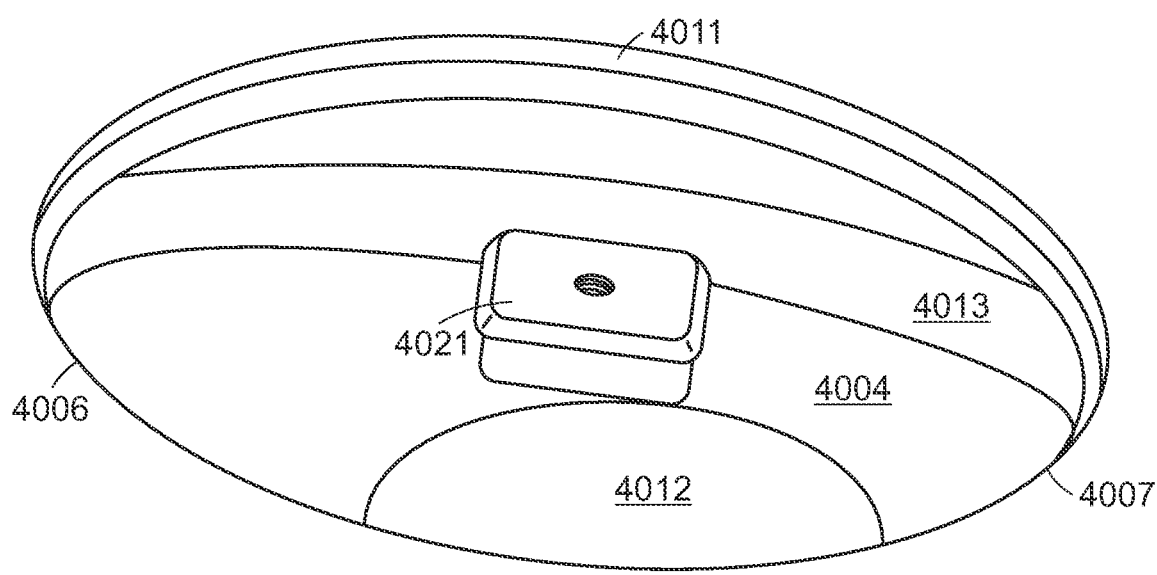
FIG. 39 of the accompanying drawings shows a frontal view of the golf club head rear portion in accordance with an alternative embodiment of the present invention shown in FIG. 38.
Figure 40:
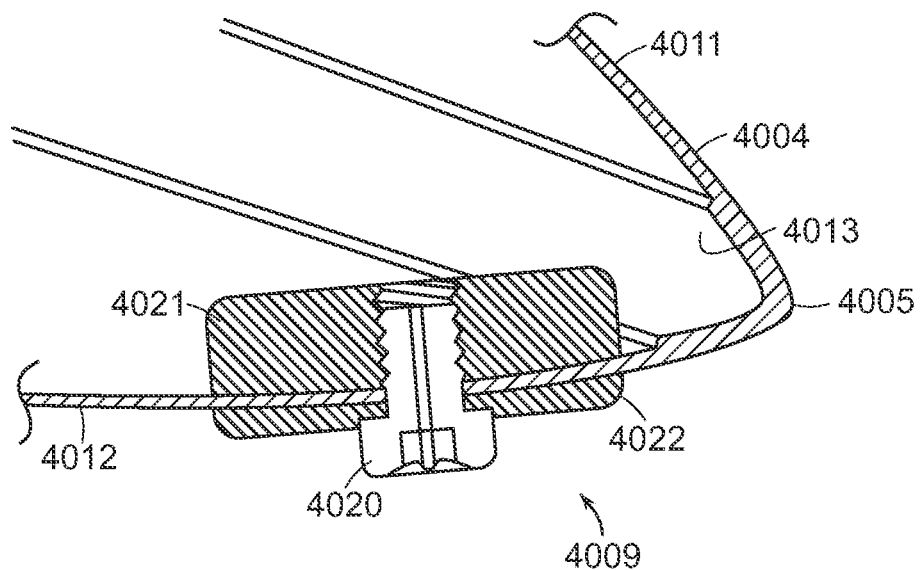
FIG. 40 of the accompanying drawings shows a close-up, cross-sectional view of the golf club head in accordance with an alternative embodiment of the present invention shown in FIG. 38.
Figure 41:
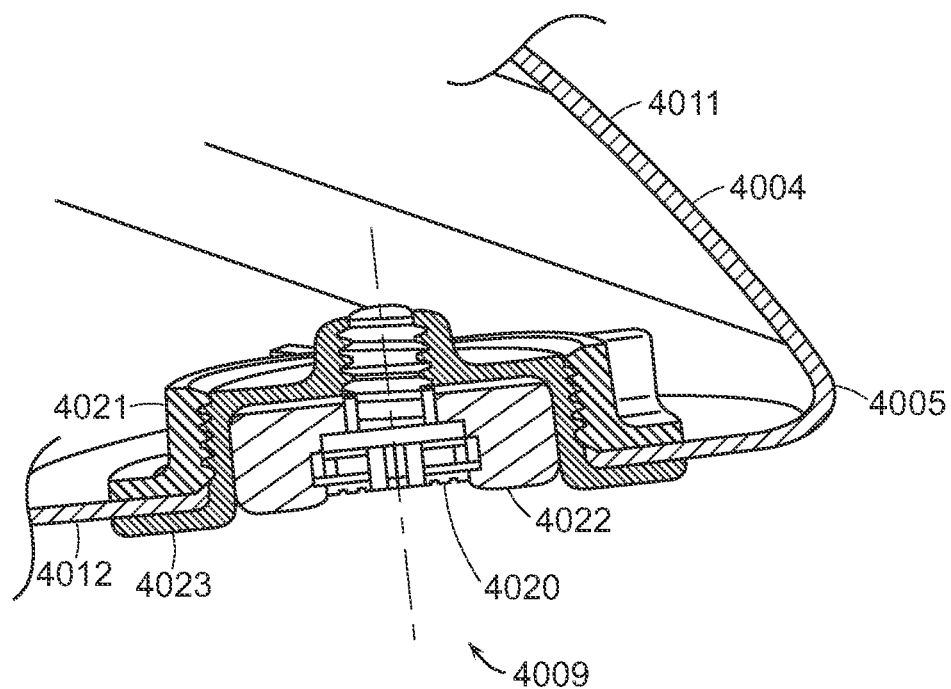
FIG. 41 of the accompanying drawings shows a close-up, cross-sectional view of the golf club head in accordance with an alternative embodiment of the present invention shown in FIG. 38.

Referring to FIGS. 36 and 37, the second weight member 3009 is shown in a close-up cross-sectional view. The second weight member 3009 is comprised of an internal weight member 3021 and an external weight member 3022 with a fastener 3020 coupling the members together to the rear portion 3004. The first weight member 3008 preferably has a similar construction but would secure about the frontal portion on the sole return 3003. Most preferably, the first weight member 3008 and the second weight member 3009 have similar shaped external weight members 3022 that can be interchanged. In this embodiment, the internal weight member 3021 and the external weight member also secure the sole plate member 3006 to the rear portion 3004 by having the rear portion 3004 and the sole plate member 3006 compressed between the internal weight member 3021 and the external weight member 3022. In the weight embodiment shown in FIG. 37, the sole plate member 3006 and the internal weight member 3021 are also threaded so that they can be coupled to the rear portion 3004 before the external weight member 3022 is couple by the fastener 3020.

Referring to FIGS. 38-41, another embodiment of a rear portion 4004 is shown with a pinch weight member 4009 secured near the back edge 4005 that is used to achieve the performance characteristics described above. The pinch weight member 4009 is similar to the second weight member 3009 discussed above. The pinch weight member 4009 is comprised of an internal weight member 4021 and an external weight member 4022 with a fastener 4020 coupling the members together to compress the rear portion 4004. A first weight member, not shown, preferably has a similar construction, but would secure about a frontal portion, also not shown. In the weight embodiment shown in FIG. 41, the sole portion 4012 is compressed between the internal weight member 4021 and a weight retaining pocket 4023 which are also threaded so that they can be coupled to the rear portion 4004 before the external weight member 4022 is coupled to the weight retaining pocket 4023 by the fastener 4020. The exterior surface of the weight retaining pocket 4023 is cylindrical with treads and the interior surface is preferably hexagonal or other polygon and matches the shape of the exterior weight member 4022 such that the exterior weight member 4022 cannot rotate in the weight retaining pocket 4023.

In a preferred embodiment, the rear portion 4004 is formed from a crown portion 4011 and a sole portion 4012 that can be coupled by a joint connector 4013. The crown portion 4011 and the sole portion 4012 are preferably injection molded separately and then coupled by the joint connector 4013. The materials for the crown portion 4011 and the sole portion 4012 are preferably the same and the material for the joint connector is preferably the same or is at least compatible such that it easily joins to the crown portion 4011 and the sole portion 4012.

In a most preferred embodiment, the rear portion 4004 is preferably formed from a high crystallinity PPS, that is a PPS in which the crystallinity is greater than 40%, and more preferably, greater than about 50% as measured using differential scanning calorimetry (DSC) at a heating rate of 20° C./min. In order to increase the crystallinity level in PPS, it is recommended that the material be injection molded into molds that are at a temperature of greater than 115° C. and more particularly in a mold that is between about 125° C. and 135° C. In the most preferred embodiment, the PPS crystallinity is between about 50% and 70%. Preferably, the PPS can be formed without any filler or can contain a filler such as glass filler. In the glass filler PPS embodiment, the PPS preferably has greater than about 20% glass filler, more preferably between about 20% and 50% and most preferably between about 30% and 50%. The material preferably has a uniform thickness of about 0.5 mm to about 2 mm. However, in one embodiment, the heel side 4007 has a thickness that is less than the thickness of the toe side 4006. In another embodiment, the thickness varies such that it is thinnest on the crown portion 4011 and thicker on the sole portion 4012. In this embodiment, the crown portion 4011 has a thickness that is preferably between about 0.5 mm and 1 mm and the sole portion 4012 thickness is between about 1 mm and 2 mm.

Figure 42:
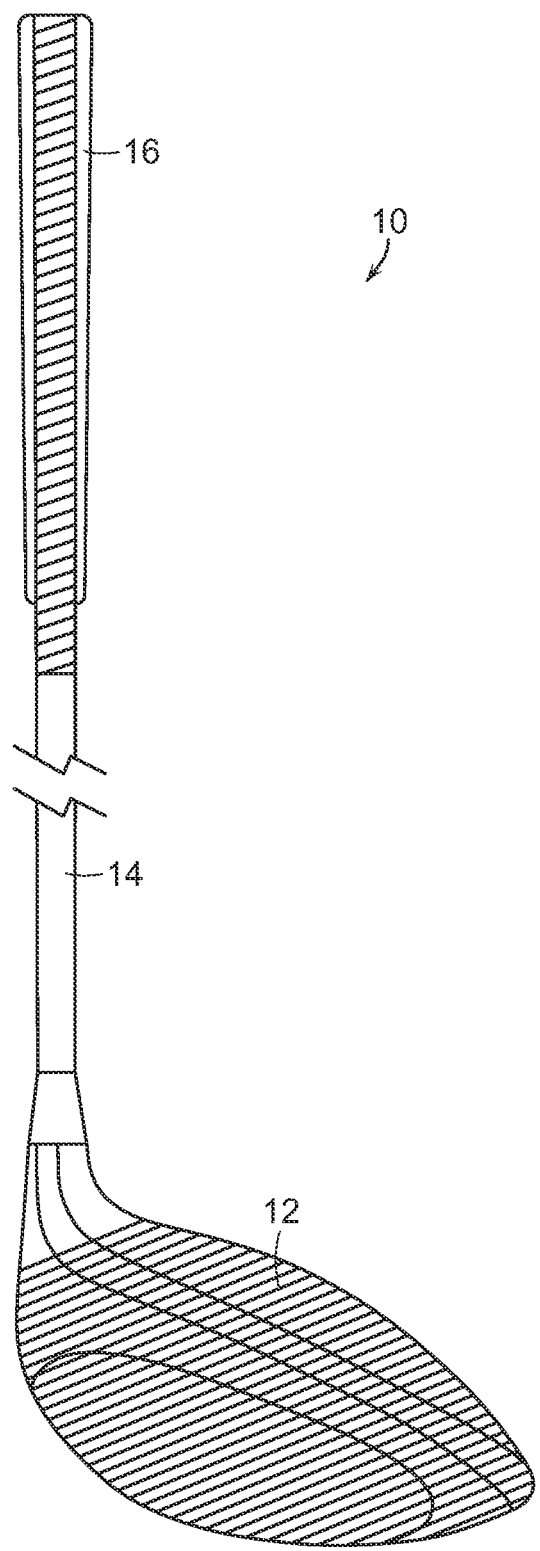
FIG. 42 of the accompanying drawings shows a golf club head, a shaft and a grip.

FIG. 42 shows a golf club head 12 attached to a first end of a shaft 14 and a grip 16 attached to a second end of the shaft 14.

Other than in the operating example, or unless otherwise expressly specified, all of the numerical ranges, amounts, values and percentages such as those for amounts of materials, moment of inertias, center of gravity locations, loft, draft angles, various performance ratios, and others in the aforementioned portions of the specification may be read as if prefaced by the word "about" even though the term "about" may not expressly appear in the value, amount, or range. Accordingly, unless indicated to the contrary, the numerical parameters set forth in the above specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. A golf club comprised of a golf club head, a shaft having a shaft axis coupled to the golf club head at a first end of the shaft and a grip coupled to the shaft at a second end of the shaft, wherein the golf club head comprises:
    a frontal portion comprised of metal and comprising a striking face having a face center located at a forward portion of said golf club head, a crown return extending from a striking face top portion and a sole return extending from a striking face bottom portion;
    a thermoplastic rear portion located aft of said striking face comprising a crown at an upper portion of said golf club that is coupled to the crown return and a sole on a bottom portion of said golf club that is coupled to the sole return; and
    wherein an x-axis is defined as a horizontal axis tangent to said face center with a positive x direction towards a heel of said golf club head, a y-axis is a vertical axis orthogonal to said x-axis with a positive y direction towards said crown of said golf club head, and a z-axis being orthogonal to both said x-axis and said y-axis with a positive z direction extending forward,
    a first weighting member located near a central portion of said golf club head in a heel-to-toe orientation, substantially in line with a vertical plane containing the z-axis with said face center, wherein the first weighting member is secured to the sole and comprises an internal weight member and a weight retaining pocket threaded to the internal weight member such that the internal weight member and the weight retaining pocket compresses the sole therebetween and a fastener couples an exterior weight member to the weight retaining pocket;
    and a second weighting member located near the central portion of said golf club head in the heel-to-toe orientation, substantially in line with the vertical plane containing the z-axis with said face center coupled to the sole return via a second fastener;
    wherein said golf club head has a moment of inertia about said y-axis (MOI-Y) passing through a center of gravity (CG) of said golf club head, said golf club head has a moment of inertia about said z-axis (MOI-Z) passing through said CG, and said golf club head has a moment of inertia about said x-axis (MOI-X) passing through said CG; and
    wherein said golf club head has a MOI-Y to MOI-Z ratio of greater than about 1.5.

2. The golf club of claim 1, wherein said golf club head has a MOI-Y to MOI-Z ratio of greater than about 1.57.

3. The golf club of claim 2, wherein said golf club head has a MOI-Y to MOI-Z ratio of equal to or greater than about 2.

4. The golf club of claim 1, wherein the golf club head has a CG-C, being a distance the CG is back, parallel to the z-axis, from the shaft axis, of between 14 mm to 21 mm.

5. The golf club of claim 1, wherein said golf club head has a MOI-X to MOI-Z ratio of greater than about 1.10.

6. The golf club of claim 5, wherein said golf club head has a MOI-X to MOI-Z ratio of greater than about 1.20.

7. The golf club of claim 6, wherein said golf club head has a MOI-X to MOI-Z ratio of greater than about 1.28.

8. The golf club of claim 1, wherein said first weighting member and said second weighting member are interchangeable to move the CG of the golf club head between a forward position and an aft position along a direction parallel to the z-axis.

9. The golf club of claim 8, wherein the first weighting member is greater than 15 grams and the second weighting member is less than 10 grams.

10. The golf club of claim 8, wherein the second weighting member is greater than 15 grams and the first weighting member is less than 10 grams.

11. A golf club comprised of a golf club head, a shaft having a shaft axis coupled to the golf club head at a first end of the shaft and a grip coupled to the shaft at a second end of the shaft, wherein the golf club head comprises:
- a frontal portion comprised of metal and comprising a striking face having a face center located at a forward portion of said golf club head, a crown return extending from a striking face top portion and a sole return extending from a striking face bottom portion;
- a rear portion comprising a thermoplastic material selected from the group consisting of polyetherimide, polyether ether ketone, polyphenylene sulfide, polysulfone, polyacryletherketone, polyetherketoneketone and polyvinyl chloride, located aft of said striking face comprising a crown at an upper portion of said golf club that is coupled to the crown return and a sole on a bottom portion of said golf club that is coupled to the sole return; and
- wherein an x-axis is defined as a horizontal axis tangent to said face center with a positive x direction towards a heel of said golf club head, a y-axis is a vertical axis orthogonal to said x-axis with a positive y direction towards said crown of said golf club head, and a z-axis being orthogonal to both said x-axis and said y-axis with a positive z direction extending forward,
- a first weighting member located near a central portion of said golf club head in a heel-to-toe orientation, substantially in line with a vertical plane containing the z-axis with said face center, wherein the first weighting member is secured to the sole and comprises an internal weight member and a weight retaining pocket threaded to the internal weight member such that the internal weight member and the weight retaining pocket compresses the sole therebetween and a fastener couples an exterior weight member to the weight retaining pocket;
- and a second weighting member located near the central portion of said golf club head in the heel-to-toe orientation, substantially in line with the vertical plane containing the z-axis with said face center coupled to the sole return via a second fastener;
- wherein said golf club head has a moment of inertia about said y-axis (MOI-Y) passing through a center of gravity (CG) of said golf club head, said golf club head has a moment of inertia about said z-axis (MOI-Z) passing through said CG, and said golf club head has a moment of inertia about said x-axis (MOI-X) passing through said CG; and
- wherein said golf club head has a MOI-Y to MOI-Z ratio of greater than about 1.5.

* * * * *